United States Patent
Qin et al.

(10) Patent No.: US 11,438,081 B2
(45) Date of Patent: Sep. 6, 2022

(54) SIGNAL TRANSMISSION METHOD, RELATED APPARATUS, AND SYSTEM

(71) Applicant: Huawei Technologies Co., Ltd., Shenzhen (CN)

(72) Inventors: Yi Qin, Kista (SE); Ming Wu, Shenzhen (CN); Zhongfeng Li, Shanghai (CN); Chi Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 16/714,408

(22) Filed: Dec. 13, 2019

(65) Prior Publication Data
US 2020/0119821 A1 Apr. 16, 2020

Related U.S. Application Data

(63) Continuation of application No. PCT/CN2018/091109, filed on Jun. 13, 2018.

(30) Foreign Application Priority Data

Jun. 16, 2017 (CN) .......................... 201710463304.5

(51) Int. Cl.
*H04B 17/336* (2015.01)
*H04B 7/08* (2006.01)
(Continued)

(52) U.S. Cl.
CPC ........... *H04B 17/336* (2015.01); *H04B 7/088* (2013.01); *H04L 1/0026* (2013.01); *H04L 5/005* (2013.01);
(Continued)

(58) Field of Classification Search
CPC ...... H04B 7/088; H04B 7/15542; H04B 7/08; H04B 7/06; H04B 17/343; H04B 17/336;
(Continued)

(56) References Cited

U.S. PATENT DOCUMENTS 8,165,073 B2 * 4/2012 Wang .................... H04L 5/0048
370/329
8,867,383 B2 * 10/2014 Frenger .............. H04B 7/15542
370/252
(Continued)

FOREIGN PATENT DOCUMENTS

CN 102202311 A 9/2011
CN 102355296 A 2/2012
(Continued)

OTHER PUBLICATIONS

IEEE Std 802.16j—2009, "Part 16: Air Interface for Broadband Wireless Access Systems, Amendment 1: Multiple Relay Specification", IEEE Computer Society and the IEEE Microwave Theory and Techniques Society, Jun. 12, 2009, total 314 pages.
(Continued)

*Primary Examiner* — Redentor Pasia
(74) *Attorney, Agent, or Firm* — Slater Matsil, LLP

(57) ABSTRACT

This application discloses a signal transmission method. The method may include: receiving, by a first device, reference configuration information for a signal resource sent by a second device, where the reference signal is used to measure interference between a first link and a second link, the first link is a link between the first device and a fourth device, the second link is a link between the second device and a third device, and the first device and the second device are relay nodes between the third device and the fourth device; and sending or receiving, by the first device, a reference signal
(Continued)

on a reference signal resource indicated by the resource configuration information for the signal resource.

18 Claims, 17 Drawing Sheets

(51) Int. Cl.
| | | |
|---|---|---|
| *H04L 1/00* | (2006.01) | |
| *H04L 5/00* | (2006.01) | |
| *H04L 25/02* | (2006.01) | |
| *H04W 8/24* | (2009.01) | |
| *H04W 24/08* | (2009.01) | |

(52) U.S. Cl.
CPC ........... *H04L 25/0226* (2013.01); *H04W 8/24* (2013.01); *H04W 24/08* (2013.01)

(58) Field of Classification Search
CPC . H04B 17/382; H04L 1/0026; H04L 25/0226; H04L 5/005; H04W 8/24; H04W 24/08
See application file for complete search history.

(56) References Cited

U.S. PATENT DOCUMENTS

| | | | | |
|---|---|---|---|---|
| 2008/0045139 | A1* | 2/2008 | Chen | H04W 16/14 |
| | | | | 455/3.04 |
| 2008/0274746 | A1* | 11/2008 | Lin | H04B 7/2606 |
| | | | | 455/449 |
| 2009/0185521 | A1 | 7/2009 | Li et al. | |
| 2010/0046414 | A1* | 2/2010 | Sundaresan | H04W 72/1231 |
| | | | | 370/315 |
| 2010/0067427 | A1* | 3/2010 | Choudhury | H04B 7/15542 |
| | | | | 370/315 |
| 2010/0323684 | A1* | 12/2010 | Cai | H04L 5/005 |
| | | | | 455/422.1 |
| 2012/0076071 | A1* | 3/2012 | Kim | H04L 5/0053 |
| | | | | 370/315 |
| 2013/0242853 | A1* | 9/2013 | Seo | H04L 5/0023 |
| | | | | 370/315 |
| 2014/0334377 | A1* | 11/2014 | Wang | H04B 7/2606 |
| | | | | 370/315 |
| 2016/0014626 | A1* | 1/2016 | Yi | H04L 5/001 |
| | | | | 370/252 |
| 2017/0257872 | A1* | 9/2017 | Lee | H04W 64/003 |
| 2017/0277707 | A1* | 9/2017 | Boudreau | H04B 7/0426 |
| 2018/0242367 | A1* | 8/2018 | Kim | H04W 74/0833 |
| 2019/0116608 | A1* | 4/2019 | Kim | H04W 72/04 |

FOREIGN PATENT DOCUMENTS

| | | |
|---|---|---|
| CN | 102461012 A | 5/2012 |
| CN | 103138869 A | 6/2013 |
| CN | 104394572 A | 3/2015 |
| JP | H1093616 A | 4/1998 |

OTHER PUBLICATIONS

Samsung, "Interference measurement table for beam coordination", 3GPP TSG-RAN WG1 Meeting #89, R1-1709041, Hangzhou, China, May 15-19, 2017, 6 pages.

Samsung, "Cross-link interference management based on coordinated beamforming", 3GPP TSG RAN WG1 Meeting #89, R1-1708056, Hangzhou, China, May 15-19, 2017, 10 pages.

AT&T, "CSI-RS Based Design of SRS for Sounding in NR", 3GPP TSG RAN WG1 Meeting NR AdHoc, R1-1700318, Spokane, USA, Jan. 16-20, 2017, 2 pages.

AT&T, "Wireless backhaul/relay for NR", 3GPP TSG RAN WG1 Meeting #86, R1-166488, Goteborg, Sweden, Aug. 22-26, 2016, 4 pages.

* cited by examiner

SIGNAL TRANSMISSION METHOD, RELATED APPARATUS, AND SYSTEM

CROSS-REFERENCE TO RELATED APPLICATIONS

This application is a continuation of International Application No. PCT/CN2018/091109, filed on Jun. 13, 2018, which claims priority to Chinese Patent Application No. 201710463304.5, filed on Jun. 16, 2017. The disclosures of the aforementioned applications are hereby incorporated by reference in their entireties.

TECHNICAL FIELD

This application relates to the field of wireless communications technologies, and in particular, to a signal transmission method, a related apparatus, and a system.

BACKGROUND

To improve coverage of a base station, an LTE/LTE-A system supports relay transmission. In a relay system, there are three types of nodes: a base station, a relay, and a terminal. As shown in FIG. 1A, a link between a base station and a relay is a backhaul (BH) link, and a link between the relay and a terminal is an access (AC) link. In the LTE system, in consideration of a problem of compatibility with users of an early system, existence of a relay is invisible to the users. Therefore, a design of an AC link directly reuses a single-hop link design in LTE.

To achieve wider coverage, the relay system may be a multi-hop relay system. There may be a plurality of backhaul links and one access link in the multi-hop relay system. For example, a three-hop relay system shown in FIG. 1B includes two relay nodes, a link between a base station and a relay 1 is a backhaul link 1, a link between the relay 1 and a relay 2 is a backhaul link 2, and a link between the relay 2 and the terminal is an access link.

A beam management technology is introduced into a new radio (NR) communications system, and is classified into uplink beam management and downlink beam management. Before a beam to be specifically used is indicated (some beams to be specifically used are indicated), channel quality or beam quality needs to be measured. In the new radio communications system, to measure the channel quality, a base station configures a user to measure a channel state information-reference signal (CSI-RS) on a CSI-RS resource, to obtain the channel quality. To enable a terminal to measure interference, the base station configures the terminal to measure strength of interference noise on a zero power CSI-RS (ZP-CSI-RS).

However, in a current system framework, the base station only controls or indicates transmission between the base station and the terminal. Moreover, in the existing multi-hop relay system, because each device can control only another device accessing the device, transmission on another link cannot be controlled. Consequently, interference measurement cannot be performed across links.

SUMMARY

This application provides a signal transmission method, a related apparatus, and a system, to measure interference between links in a multi-hop relay system, thereby avoiding such interference through beam selection and so on.

According to a first aspect, this application provides a signal transmission method, applied to a first device side. The method includes: receiving, by a first device, reference signal resource configuration information sent by a second device; and then sending or receiving a reference signal on a reference signal resource indicated by the reference signal resource configuration information.

According to a second aspect, this application provides a signal transmission method, applied to a second device side. The method includes: sending, by a second device, reference signal resource configuration information to a first device; and sending or receiving a reference signal on a resource indicated by the reference signal resource configuration information.

With reference to the first aspect and the second aspect, the reference signal is used to measure interference between a first link and a second link, the first link is a link between the first device and a fourth device, the second link is a link between the second device and a third device, and the first device and the second device are relay nodes between the third device and the fourth device.

Through implementation of the methods described according to the first aspect and the second aspect, interference between links can be measured in a multi-hop relay system, thereby avoiding such interference through beam selection or another approach.

With reference to the first aspect or the second aspect, main solutions for measuring the interference by using the reference signal may include the following.

Solution 1: The second device may configure interference measurement for the first device.

In addition, the interference between the first link and the second link may alternatively be measured by using a reference signal on a link (namely, a third link) between the second device and the first device. Main solutions may include the following.

Solution 3: The second device may configure an uplink reference signal (such as SRS) resource for the first device, where an uplink reference signal (such as an SRS) is used to measure interference of downlink transmission on the first link to downlink transmission on the second link. Specifically, the first device may send the uplink reference signal on the third link. The second device may receive the uplink reference signal by using a receiving apparatus corresponding to the second link, and perform channel measurement. A measurement result corresponding to the uplink reference signal may be used by the second device to determine interference of the first device to the second device, namely, the interference of the downlink transmission on the first link to the downlink transmission on the second link.

A precondition of the foregoing solution 3 is that sending of a reference signal by the first device on the third link can be equivalent to sending of a reference signal by the first device on the first link. The precondition may be implemented in the following manner: Antenna ports for the first device to send the reference signals on the third link and the first link are quasi co-located (QCL), or beams for the first device to send the reference signals on the third link and the first link are the same.

It may be understood that, because sending of the reference signal by the first device on the third link can be equivalent to sending of the reference signal by the first device on the first link, the uplink reference signal received by the second device by using the receiving apparatus corresponding to the second link can be equivalent to interference generated to the second device by the reference signal that is sent by the first device on the first link, namely, the interference of the downlink transmission on the first link to the downlink transmission on the second link.

Solution 4: The second device may configure a downlink reference signal (such as CSI-RS) resource for the first device, where a downlink reference signal (such as a CSI-RS) is used to measure interference of uplink transmission on the second link to uplink transmission on the first link. The second device may send the downlink reference signal by using a transmitting apparatus corresponding to the second link. The first device receives the uplink reference signal on the third link, and performs channel measurement. A measurement result corresponding to the uplink reference signal may be used by the first device to determine interference of the second device to the first device, namely, the interference of the uplink transmission on the second link to the uplink transmission on the first link.

A precondition of the foregoing solution 4 is that receiving of a reference signal by the first device on the third link can be equivalent to receiving of a reference signal by the first device on the first link. The precondition may be implemented in the following manner. Antenna ports for the first device to receive the reference signals on the third link and the first link are quasi co-located (QCL), or beams for the first device to receive the reference signals on the third link and the first link are the same.

It may be understood that, because receiving of the reference signal by the first device on the third link can be equivalent to receiving of the reference signal by the first device on the first link, the downlink reference signal received by the first device can be equivalent to interference generated to the first device by the downlink reference signal that is sent by the second device by using the transmitting apparatus corresponding to the second link, namely, the interference of the uplink transmission on the second link to the uplink transmission on the first link.

In the foregoing solution 3 and solution 4, the first device has a multi-link beam correspondence capability. In this application, the multi-link beam correspondence capability of the first device may be summarized as a capability of the first device to send or receive, on the first link and a third link, reference signals on antenna ports having a quasi co-location (QCL) relationship. The multi-link beam correspondence capability of the first device may alternatively be summarized as a capability of the first device to send or receive reference signals on the first link and a third link by using a same beam or a same spatial filter. The spatial filter may be at least one of the following: precoding, a weight of an antenna port, a phase deflection of an antenna port, or an amplitude gain of an antenna port. Herein, the first link of the first device is an uplink first link between the first device and a terminal, and a backhaul link of the first device is an uplink third link between the first device and the second device.

With reference to the foregoing four solutions, interference measurement types corresponding to a reference signal used to measure interference between links may include the following two types.

A first measurement type is measurement of interference of downlink transmission on the access link to downlink transmission on the backhaul link 1, or measurement of interference of downlink transmission on an access link to a relay 1.

A second measurement type is measurement of interference of uplink transmission on the backhaul link 1 to uplink transmission on the access link, or measurement of interference of uplink transmission on a backhaul link 1 to a relay 2.

With reference to the first aspect or the second aspect, in some embodiments, the measurement type corresponding to the reference signal may be indicated in the following several manners:

In a first manner, the relay 1 may add indication information of the measurement type to resource configuration information sent to the relay 2. For example, a reserved field in existing resource configuration information is extended, and the extended reserved field is used to indicate the measurement type. The example is merely an example provided in this application, and should not constitute a limitation.

In a second manner, the relay 1 may additionally send indication information to the relay 2, where the indication information is used to indicate the measurement type. In this application, the indication information may be referred to as first indication information.

In a third manner, the reference signal resource may be associated with the measurement type. For example, a reference signal mapped to a resource represented by a "resource pattern (or set) 1" is used for interference measurement of the first measurement type, and a reference signal mapped to a resource represented by a "resource pattern (or set) 2" is used for interference measurement of the second measurement type. The example is merely used to explain this application, and should not constitute a limitation. Specifically, the association may be predefined in a protocol, or may be statically or semi-statically configured by using higher layer signaling. Specific implementation of the association is not limited in this application.

With reference to the first aspect or the second aspect, in some embodiments, the first device may send first reporting information to the second device, to report whether the first device has the multi-link beam correspondence capability. Optionally, the second device may further continue to report, to the third device, whether the first device has the multi-link beam correspondence capability. For descriptions of a beam correspondence, refer to an invention principle part. Details are not described herein.

The first device reports the multi-link beam correspondence capability to the second device, so that the second device can determine, depending on whether the first device has the beam correspondence capability, an interference measurement method to be used. Specifically, the second device may determine, depending on whether the first device has the beam correspondence capability, a solution corresponding to a specific above-described embodiment to be used. Details may be described as follows:

When the reference signal is used for the interference measurement of the first measurement type, if the first device does not have the beam correspondence capability, the second device may configure the first device to send the downlink reference signal (such as the CSI-RS) on the first link. Refer to the foregoing solution 1. If the first device has the beam correspondence capability, the second device may configure the first device to send the uplink reference signal (such as the SRS) on the third link. Refer to the foregoing solution 3. Optionally, if the first device has the beam correspondence capability, the second device may alternatively configure the first device to send the downlink reference signal (such as the CSI-RS) on the first link. Refer to the foregoing solution 1.

When the reference signal is used for the interference measurement of the second measurement type, if the first device does not have the beam correspondence capability, the second device may configure the first device to receive the uplink reference signal (such as the SRS). Refer to the foregoing solution 2. If the first device has the beam correspondence capability, the second device may configure the first device to receive the downlink reference signal (such as the CSI-RS) on the third link. Refer to the foregoing solution 2 and solution 4. Optionally, if the first device has the beam correspondence capability, the second device may alternatively configure the first device to receive the uplink reference signal (such as the SRS). Refer to the foregoing solution 2.

With reference to the first aspect or the second aspect, in some embodiments, after the interference between the links is measured by using the reference signal, the measurement result may be used to determine a transmit beam or a receive beam of the first device. The measurement result is not limited to being used to select a beam, but may be further used for another aspect. For example, the measurement result may be used to select a data transmission frequency resource. When there is relatively strong interference in a band range, a device does not schedule a resource in the band for data transmission. For another example, the measurement result may be further used to select a relay. When there is relatively strong interference between the first link and the second link, the terminal may directly access the second device. Application of the interference measurement is not limited in this application.

According to a third aspect, this application provides a communications apparatus. The communications apparatus has a function of implementing behavior of the first device according to any one of the first aspect or the possible implementations of the first aspect. The function may be implemented by hardware, or may be implemented by hardware executing corresponding software. The hardware or the software includes one or more modules corresponding to the foregoing function.

According to a fourth aspect, this application provides a communications apparatus. The communications apparatus has a function of implementing behavior of the second device according to any one of the second aspect or the possible implementations of the second aspect. The function may be implemented by hardware, or may be implemented by hardware executing corresponding software. The hardware or the software includes one or more modules corresponding to the foregoing function.

According to a fifth aspect, this application provides a communications apparatus, configured to perform the signal transmission method described according to the first aspect. The communications apparatus may include a transmitter and a receiver. Optionally, the communications apparatus may further include a processor and a memory coupled to the processor.

The receiver is configured to receive reference signal resource configuration information sent by a second device, where the reference signal is used to measure interference between a first link and a second link.

The transmitter is configured to send the reference signal on a resource indicated by the reference signal resource configuration information, or the receiver is configured to receive the reference signal, where a measurement result corresponding to the reference signal is used to determine the interference between the first link and the second link.

The first link is a link between the first device and a fourth device, the second link is a link between the second device and a third device, the first device and the second device are relay nodes between the third device and the fourth device, and a link between the second device and the first device is a third link.

Specifically, the memory may be configured to store implementation code of the signal transmission method described according to the first aspect, and the processor is configured to execute program code stored in the memory, to be specific, perform the method provided according to the first aspect, or the method provided according to any one of the possible implementations of the first aspect.

According to a sixth aspect, this application provides a communications apparatus, configured to perform the signal transmission method described according to the first aspect. The communications apparatus may include a transmitter and a receiver. Optionally, the communications apparatus may further include a processor and a memory coupled to the processor.

The transmitter is configured to send reference signal resource configuration information to a first device, where the reference signal is used to measure interference between a first link and a second link.

The receiver is configured to receive the reference signal, or the transmitter is configured to send the reference signal on a resource indicated by the reference signal resource configuration information, where a measurement result corresponding to the reference signal is used to determine the interference between the first link and the second link.

The first link is a link between the first device and a fourth device, the second link is a link between the second device and a third device, the first device and the second device are relay nodes between the third device and the fourth device, and a link between the second device and the first device is a third link.

Specifically, the memory may be configured to store implementation code of the signal transmission described according to the second aspect, and the processor is configured to execute program code stored in the memory, to be specific, perform the method provided according to the second aspect, or the method provided according to any one of the possible implementations of the second aspect.

According to a seventh aspect, a communications system is provided. The communications system includes a first device, a second device, a third device, and a fourth device, where the first device and the second device are relay nodes between the third device and the fourth device, a link between the first device and the fourth device is a first link, a link between the second device and the third device is a second link, and a link between the second device and the first device is a third link.

The second device sends reference signal resource configuration information to the first device, where the reference signal is used to measure interference between the first link and the second link.

The first device receives the reference signal resource configuration information sent by the second device, and sends or receives the reference signal on a resource indicated by the reference signal resource configuration information, where a measurement result corresponding to the reference signal is used to determine the interference between the first link and the second link.

Specifically, the first device may be the communications apparatus described according to the third aspect or the fifth aspect, and the second device may be the communications apparatus described according to the fourth aspect or the sixth aspect.

According to an eighth aspect, a computer-readable storage medium is provided. The readable storage medium stores an instruction, and when the instruction is run on a computer, the computer is enabled to perform the signal transmission method described according to the first aspect.

According to a ninth aspect, another computer-readable storage medium is provided. The readable storage medium stores an instruction, and when the instruction is run on a computer, the computer is enabled to perform the signal transmission method described according to the second aspect.

According to a tenth aspect, a computer program product including an instruction is provided. When the computer program product is run on a computer, the computer is enabled to perform the signal transmission method described according to the first aspect.

According to an eleventh aspect, another computer program product including an instruction is provided. When the computer program product is run on a computer, the computer is enabled to perform the signal transmission method described according to the second aspect.

BRIEF DESCRIPTION OF THE DRAWINGS

To describe the technical solutions in the embodiments of this application or in the background more clearly, the following briefly describes the accompanying drawings required for describing the embodiments of this application or the background.

DETAILED DESCRIPTION OF ILLUSTRATIVE EMBODIMENTS

Terms used in the part of implementations of this application are merely used to explain specific embodiments of this application, and are not intended to limit this application.

Figure 1A:
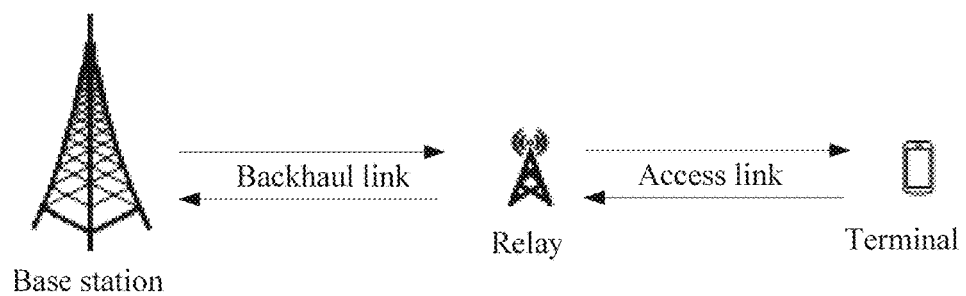
FIG. 1A is a schematic diagram of a two-hop relay system according to this application.
Figure 1B:
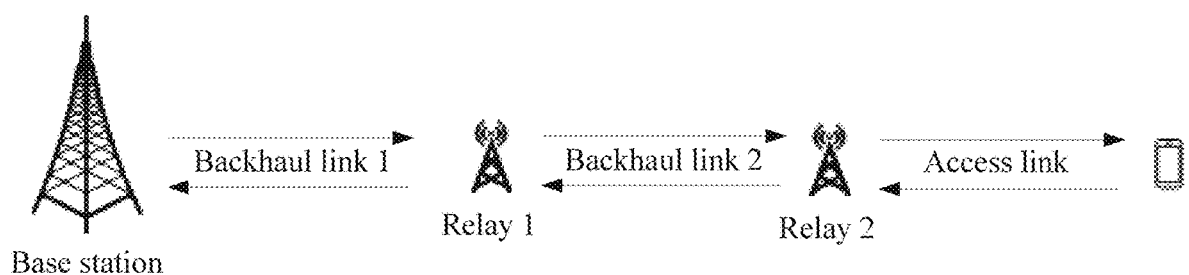
FIG. 1B is a schematic diagram of a three-hop relay system according to this application.
Figure 2:
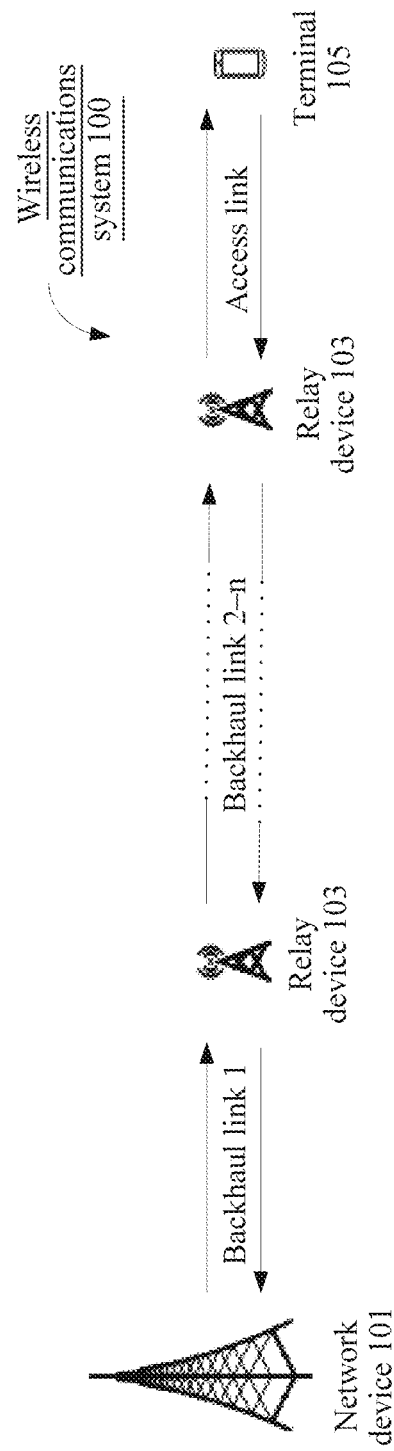
FIG. 2 is a schematic diagram of a multi-hop relay system according to this application.

FIG. 2 shows a wireless communications system in this application. The wireless communications system may be a long term evolution (LTE) system, or may be a future evolved 5th generation mobile communications (5G) system, a new radio (NR) system, a machine to machine communications (M2M) system, or the like. As shown in FIG. 2, the wireless communications system 100 may include a network device 101, a terminal 105, and relay devices 103. The wireless communications system 100 may be a multi-hop relay system, and there are at least two relay devices 103 between the network device 101 and the terminal 105. Optionally, the wireless communications system 100 may be a three-hop relay system shown in FIG. 1B.

The network device 101 may be a base station. The base station may be configured to communicate with one or more terminals, or may be configured to communicate with one or more base stations having some functions of a terminal (for example, communicating with a macro base station, a micro base station or an access point). The base station may be a base transceiver station (BTS) in a time division-synchronous code division multiple access (TD-SCDMA) system, or may be an evolved NodeB (Evolutional Node B, eNB) in an LTE system, or a base station gNB in a 5G system or a new radio (NR) system. In addition, the base station may alternatively be an access point (AP), a transmission point (Trans TRP), a central unit (CU), or another network entity, and may include some or all of functions of the foregoing network entities.

Terminals 105 may be distributed in the entire wireless communications system 100, and may be stationary or mobile. In some embodiments of this application, the terminal 105 may be a mobile device, a mobile station, a mobile unit, an M2M terminal, a wireless unit, a remote unit, a user agent, a mobile client, or the like.

The relay devices 103 may be distributed on an edge of a cell, and can expand coverage of the network device 101. The relay device 103 (also referred to as a relay node) may include two physical layer entities. One entity is configured to communicate with a user (namely, the terminal 105 accessing the relay device 103) served by the entity. The other entity has a user function (namely, a terminal function), and is configured to communicate with the network device 101. In specific implementation, the relay device 103 may be a relay base station, for example, a micro base station. The relay device 103 may alternatively be a relay terminal, for example, an idle terminal. The relay device 103 may alternatively be a network entity such as a relay transmission/reception point (TRP), customer premises equipment (CPE), a relay transceiver, or a relay agent.

In the wireless communications system 100, an access link is a radio link between the relay device 103 and the terminal 105, and includes an uplink (UL) or downlink (DL) access link. A backhaul link is a radio link between the network device 101 and the relay device 103, and includes an uplink (UL) or downlink (DL) backhaul link.

In the wireless communications system 100, a plurality of relay devices 103 between the network device 101 and the terminal 105 may be configured to forward a radio signal between the network device 101 and the terminal 105 a plurality of times. Specifically, during downlink transmission, the plurality of relay devices 103 are responsible for forwarding, a plurality of times, a radio signal transmitted by the network device 101, to finally transmit the radio signal to the terminal 105. To be specific, the radio signal arrives at the terminal 105 through a plurality of hops. During uplink transmission, the plurality of relay devices 103 are responsible for forwarding, a plurality of times, a radio signal transmitted by the terminal 105, to finally transmit the radio signal to the network device 101. To be specific, the radio signal arrives at the network device 101 through a plurality of hops.

An example in which the wireless communications system 100 is a three-hop relay system is used to describe a problem of interference between links in a multi-hop relay system in the following.

Figure 3A:
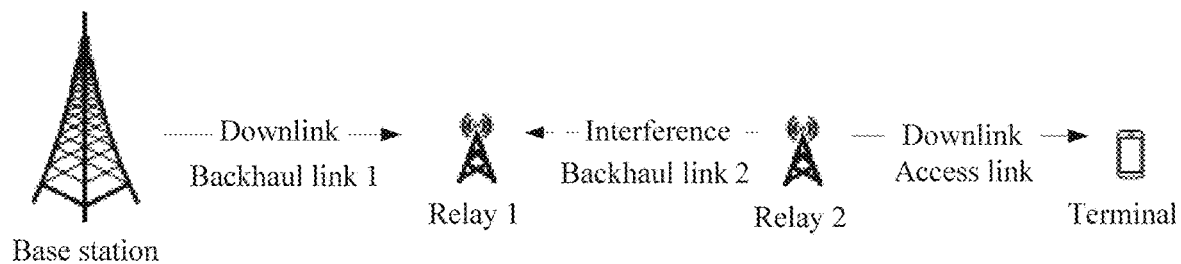
FIG. 3A and FIG. 3B are schematic diagrams of interference between links in a three-hop relay system.

As shown in FIG. 3A, in a three-hop relay system, downlink transmission is performed on a backhaul link 1 and an access link on a same time-frequency resource. It may be understood that, because a signal transmitted by a relay 2 can also be received by a relay 1, a downlink signal sent by the relay 2 on the access link generates interference to a downlink signal sent by a base station and received by the relay 1. To be specific, the downlink transmission on the access link generates interference to the downlink transmission on the backhaul link 1.

Figure 3B:
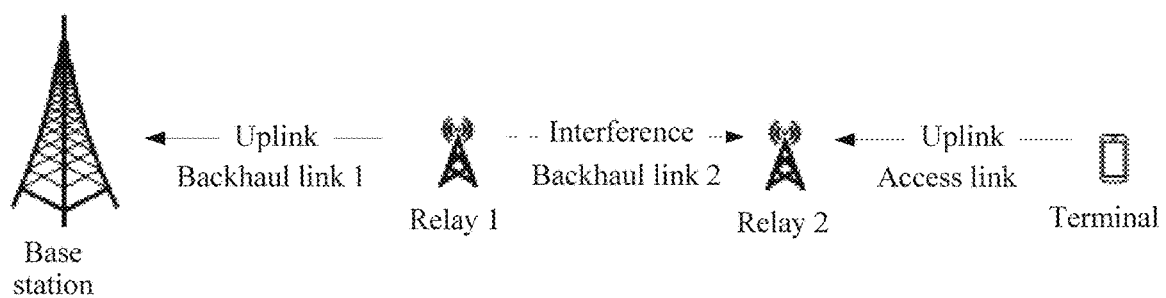

As shown in FIG. 3B, in a three-hop relay system, uplink transmission is performed on a backhaul link 1 and an access link on a same time-frequency resource. It may be understood that, because a signal transmitted by a relay 1 can also be received by a relay 2, an uplink signal sent by the relay 1 on the backhaul link generates interference to an uplink signal sent by a terminal and received by the relay 2. To be specific, the uplink transmission on the backhaul link 1 generates interference to the uplink transmission on the access link.

The examples in FIG. 3A and FIG. 3B are merely used to explain this application, and should not constitute a limitation. It can be learned that, in the multi-hop relay system, interference needs to be measured across links, to ensure correct receiving of signals on the links.

Not limited to the three-hop relay systems shown in FIG. 3A and FIG. 3B, a problem of interference between links also exists in more-hop (for example, four-hop or five-hop) relay systems.

Figure 4A:
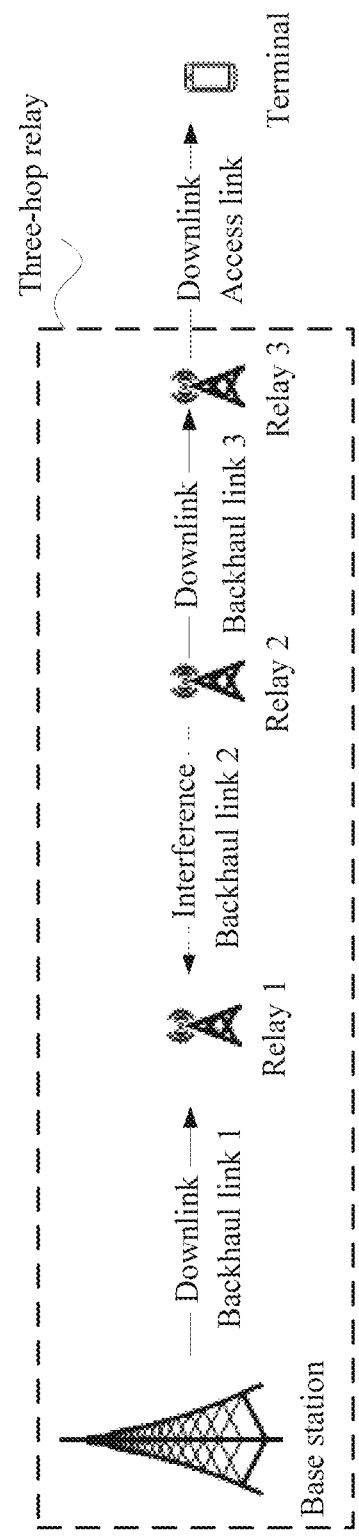
FIG. 4A and FIG. 4B are schematic diagrams of two types of three-hop relays in a multi-hop relay system.

For example, as shown in FIG. 4A, in a four-hop relay system, during downlink transmission, a downlink signal sent by a relay 2 on a backhaul link 3 generates interference to a downlink signal sent by a base station and received by a relay 1. To be specific, downlink transmission on the backhaul link 3 generates interference to downlink transmission on a backhaul link 1.

Figure 4B:
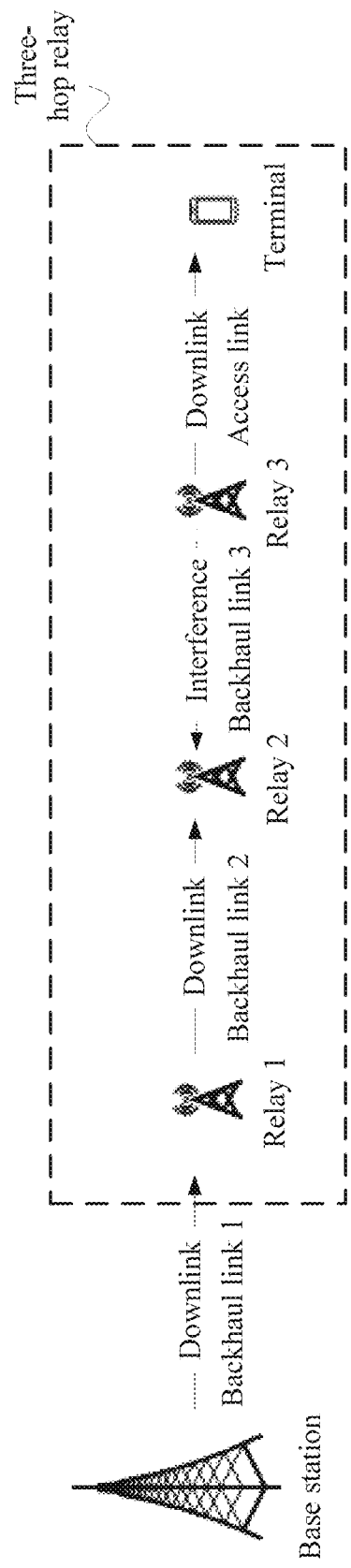

For another example, as shown in FIG. 4B, in a four-hop relay system, during downlink transmission, a downlink signal sent by a relay 3 on an access link generates interference to a downlink signal sent by a relay 1 and received by a relay 2. To be specific, downlink transmission on the access link generates interference to downlink transmission on a backhaul link 2.

The examples in FIG. 4A and FIG. 4B are merely used to explain this application, and should not constitute a limitation. In the four-hop relay systems in FIG. 4A and FIG. 4B or a more-hop relay system, any three-hop relay may be similarly considered as a three-hop relay shown in FIG. 3A and FIG. 3B, and a problem of interference between links may be analyzed. For details about how to measure interference across links, refer to subsequent embodiments.

It should be noted that, the wireless communications system 100 shown in FIG. 2 is merely intended to more clearly describe the technical solutions in this application, and does not constitute a limitation on this application. A person of ordinary skill in the art may understand that, with evolution of network architectures and emergence of new service scenarios, the technical solutions provided in this application are also applicable to a similar technical problem.

Figure 5A:
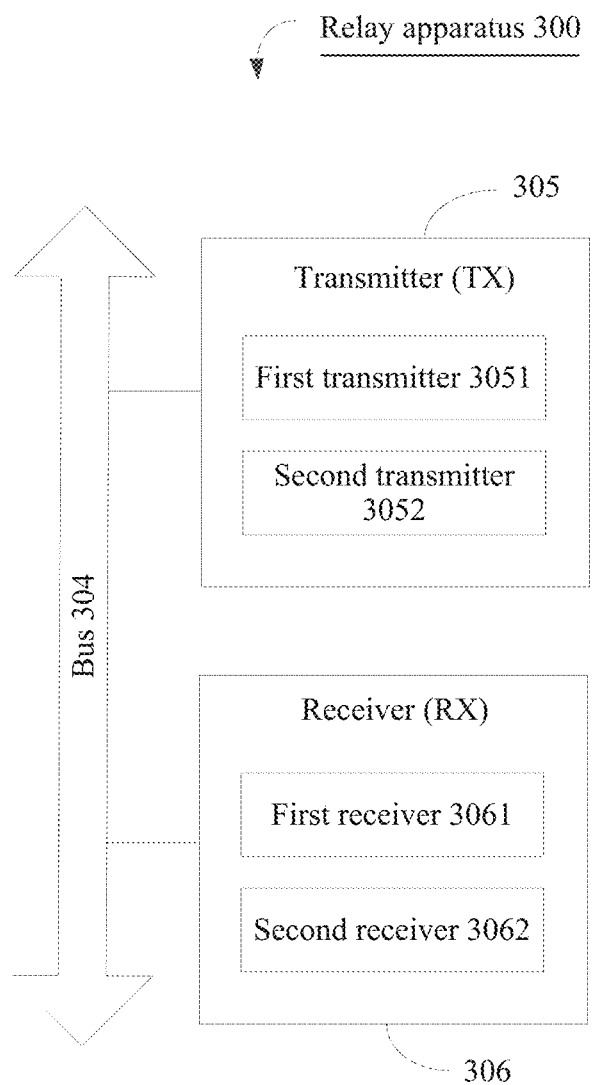
FIG. 5A is a schematic diagram of a hardware architecture of a relay apparatus according to an embodiment of this application.
Figure 5B:
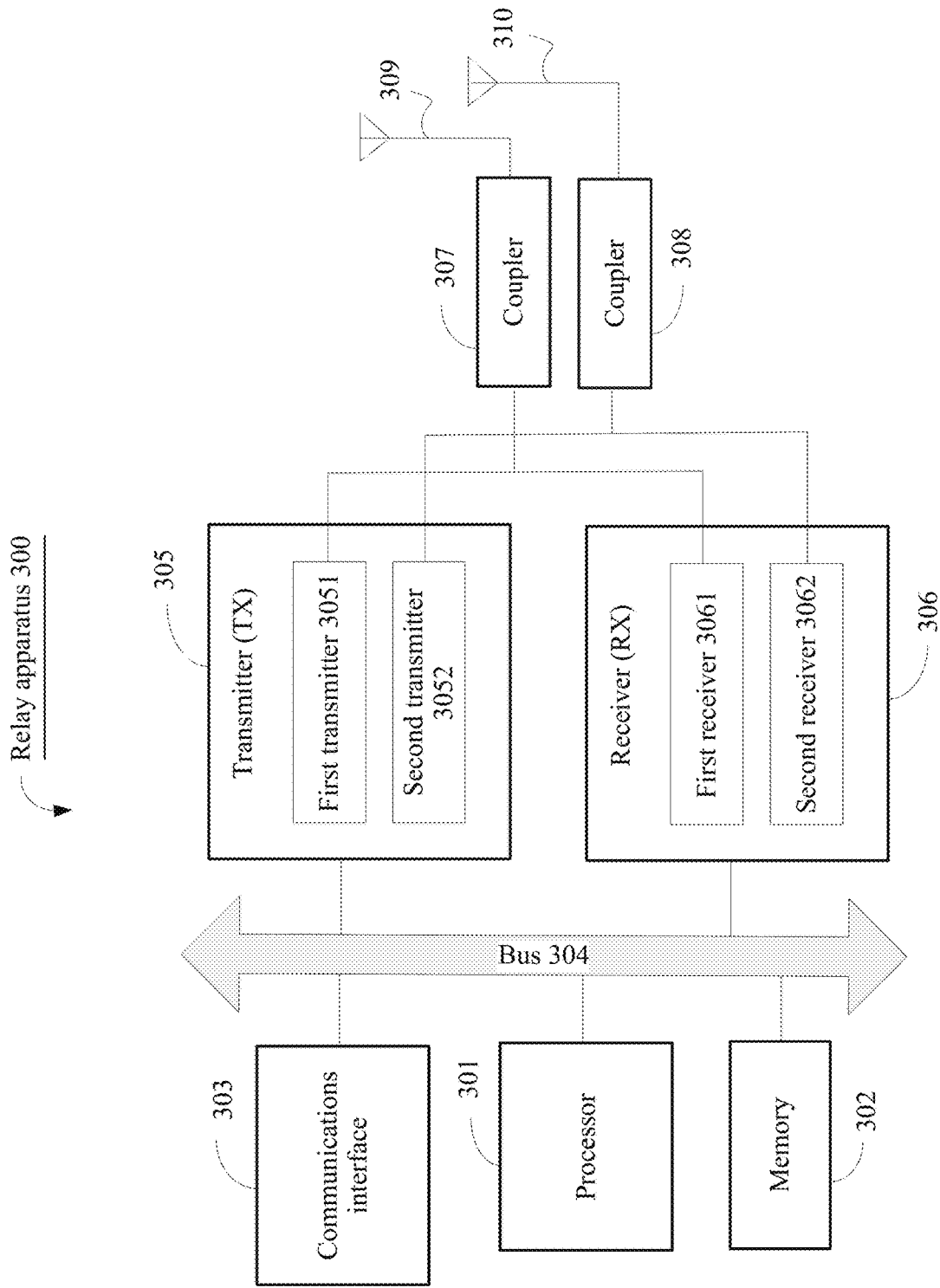
FIG. 5B is a schematic diagram of a hardware architecture of a relay apparatus according to another embodiment of this application.

FIG. 5A shows a relay apparatus 300 according to some embodiments of this application. As shown in FIG. 5A, the relay apparatus 300 may include a transmitter 305 and a receiver 306. Optionally, as shown in FIG. 5B, the relay apparatus 300 may further include one or more processors 301, a memory 302 coupled to the processor 301, a communications interface 303, a transmitter 305, a receiver 306, a coupler, and an antenna. These components shown in FIG. 5A or FIG. 5B may be connected by using a bus 304 or in another manner, and connection by using the bus is used as an example in FIG. 5A or FIG. 5B.

The transmitter 305 may be configured to transmit, for example, perform signal modulation on, a signal that is output by the processor 301. The receiver 306 may be configured to receive, for example, perform signal demodulation on, a radio signal received by the antenna. In some embodiments of this application, two sets of transceiver apparatuses may be configured for the relay apparatus 300. One set of transceiver apparatus is configured for a link where another communications device accesses the relay apparatus 300, and the other set of transceiver apparatus is configured for a link where the relay apparatus 300 accesses another communications device. The relay 2 in FIG. 3A and FIG. 3B is used as an example. For the relay 2, one set of transceiver apparatus used for an access link may be configured, and another set of transceiver apparatus used for a backhaul link 2 may be further configured. As shown in FIG. 5A, the two sets of transceiver apparatuses may include one set of transceiver apparatus including a first transmitter 3051 and a first receiver 3061, and the other set of transceiver apparatus including a second transmitter 3052 and a second receiver 3062. The two sets of transceiver apparatuses transmit or receive a radio signal respectively through an antenna 309 and an antenna 310. Specifically, the two sets of transceiver apparatuses may have a same receive/transmit characteristic or different receive/transmit characteristics. For example, antenna ports respectively corresponding to the two sets of transceiver apparatuses have or do not have a quasi co-location (QCL) characteristic. For description of a QCL, refer to a subsequent invention principle part. Not limited to that shown in FIG. 5A, the relay apparatus 300 may alternatively include at least two sets of transceiver apparatuses. Not limited to that shown in FIG. 5A, the two or more sets of transceiver apparatuses may be integrated into one transceiver. The transceiver may present different receive/transmit characteristics through software control. Optionally, only one set of transceiver apparatus may alternatively be configured for the relay apparatus 300. The relay 2 in FIG. 3A and FIG. 3B is used as an example. Only one set of transceiver apparatus may be configured for the relay 2. The transceiver apparatus may be used for not only sending and receiving on the access link, but also sending and receiving on the backhaul link 2. The example is merely used to explain this application, and should not constitute a limitation.

The communications interface 303 may be used by the relay device 300 to communicate with another communications device such as a relay device, a terminal, or a network device. Specifically, the communications interface 303 may be a long term evolution (LTE) (4G) communications interface, or may be a communications interface in 5G or future new radio, or may be a wireless fidelity (Wi-Fi) interface, or may be a worldwide interoperability for microwave access (wimax) wideband wireless interface, or the like. Not limited to a wireless communications interface, a wired communications interface 303 may be further configured for the relay device 300 to support wired communication, for example, a backhaul link between the relay device 300 and the network device or another relay device may be a wired communication connection.

The memory 302 is coupled to the processor 301, and is configured to store various software programs and/or a plurality of groups of instructions. Specifically, the memory 302 may include a high speed random access memory, and may also include a non-volatile memory such as one or more magnetic disk storage devices, flash memory devices, or other non-volatile solid state storage devices. The memory 302 may store an operating system (a system for short below), for example, an embedded operating system such as uCOS, VxWorks, or RTLinux. The memory 302 may further store a network communication program. The network communication program may be used to communicate with one or more relay devices, one or more terminal devices, and one or more network devices.

The processor 301 may be configured to perform two parts of logical functions: a base station function and a terminal function. The base station function is used to provide an access service for a terminal or another accessed relay device, and the terminal function is used to send and receive data on the backhaul link. In this application, the processor 301 may be configured to read and execute a computer-readable instruction. Specifically, the processor 301 may be configured to: invoke a program stored in the memory 302, for example, an implementation program of a signal transmission method provided in one or more embodiments of this application, and execute an instruction included in the program.

It may be understood that, the relay device 300 may be the relay device in the wireless communications system 100 shown in FIG. 2, and may be implemented as a network entity such as a relay base station, a relay terminal, a relay transceiver, a relay transmission/reception point (TRP), or a relay agent. It should be noted that, the relay device 300 shown in FIG. 5A or FIG. 5B is merely an implementation of this embodiment of this application, and in actual application, the relay device 300 may alternatively include more or fewer components. This is not limited herein.

Figure 6:
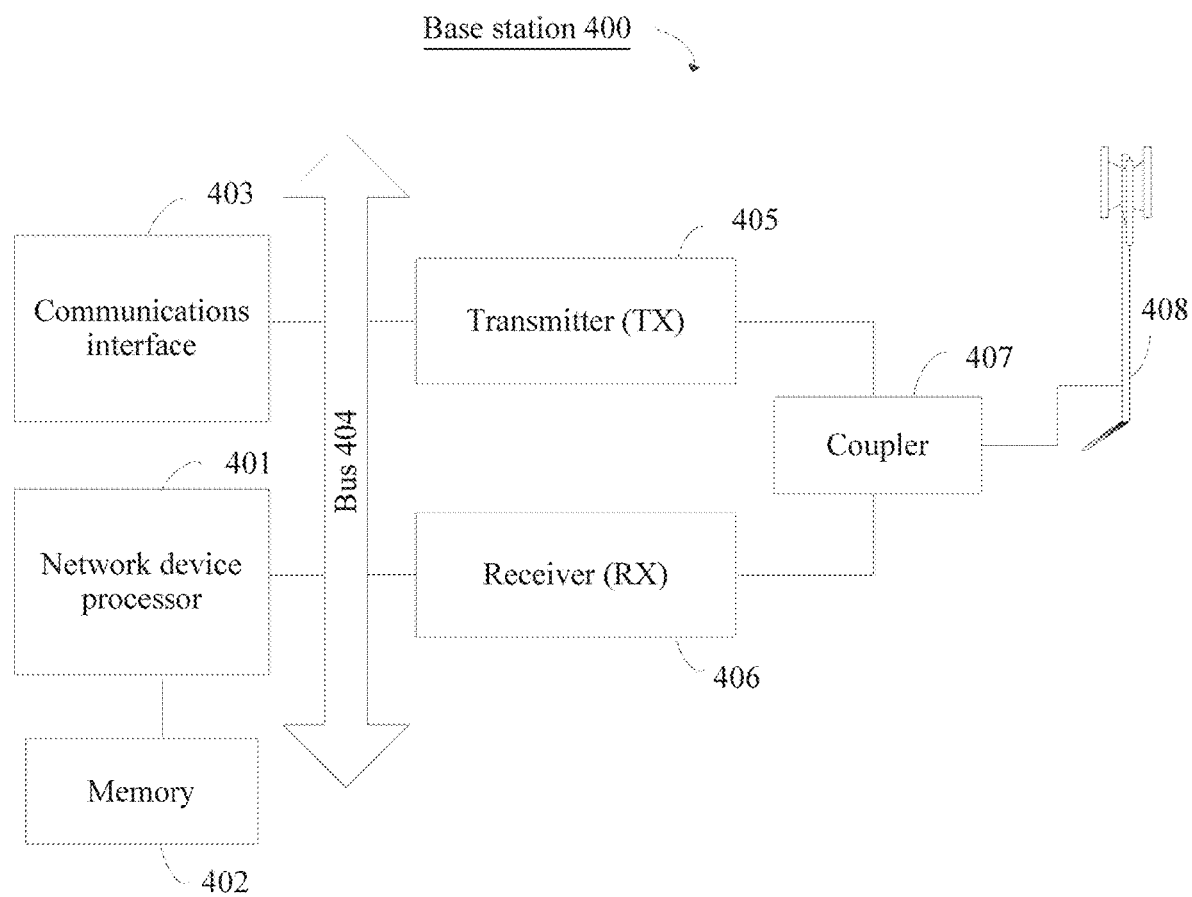
FIG. 6 is a schematic diagram of a hardware architecture of a base station according to an embodiment of this application.

FIG. 6 shows a base station 400 according to some embodiments of this application. The base station 400 may be a network device having a network access capability. The base station 400 may be the network device 101 in FIG. 2. As shown in FIG. 6, the base station 400 may include one or more processors 401, a memory 402, a communications interface 403, a transmitter 405, a receiver 406, a coupler 407, and an antenna 408. These components may be connected by using a bus 404 or in another manner, and connection by using the bus is used as an example in FIG. 6.

The communications interface 403 may be used by the base station 400 to communicate with another communications device such as a terminal or a relay device. Specifically, the communications interface 403 may be a long term evolution (LTE) (4G) communications interface, or may be a communications interface in 5G or future new radio. Not limited to a wireless communications interface, a wired communications interface 403 may be further configured for the base station 400 to support wired communication, for example, a backhaul link between the base station 400 and another base station 400 may be a wired communication connection.

The transmitter 405 may be configured to transmit, for example, perform signal modulation on, a signal that is output by the processor 401. The receiver 406 may be configured to receive, for example, perform signal demodulation on, a radio signal received by the antenna 408. In some embodiments of this application, the transmitter 405 and the receiver 406 may be considered as one wireless modem. In the base station 400, there may be one or more transmitters 405 and there may be one or more receivers 406. The antenna 408 may be configured to convert electromagnetic energy in a transmission line into an electromagnetic wave in free space, or convert an electromagnetic wave in free space into electromagnetic energy in a transmission line. The coupler 407 may be configured to divide mobile communications signals into a plurality of paths, for allocation to a plurality of receivers 406.

The memory 402 is coupled to the processor 401, and is configured to store various software programs and/or a plurality of groups of instructions. Specifically, the memory 402 may include a high speed random access memory, and may also include a non-volatile memory such as one or more magnetic disk storage devices, flash memory devices, or other non-volatile solid state storage devices. The memory 402 may store an operating system (a system for short below), for example, an embedded operating system such as uCOS, VxWorks, or RTLinux. The memory 402 may further store a network communication program. The network communication program may be used to communicate with one or more relay devices, one or more terminal devices, and one or more network devices.

The processor 401 may be configured to: manage a radio channel, make a call and establish and delete a communication link, provide cell handover control for a user in a local control area, and the like. Specifically, the processor 401 may include an administration module/communications module (AM/CM) (a center for speech channel exchange and information exchange), a basic module (BM) (configured to complete functions of call processing, signaling processing, radio resource management, radio link management, and circuit maintenance), a transcoder and submultiplexer (TCSM) (configured to complete functions of multiplexing/demultiplexing and code conversion), and the like.

In this application, the processor 401 may be configured to read and execute a computer-readable instruction. Specifically, the processor 401 may be configured to: invoke a program stored in the memory 402, for example, an implementation program of a signal transmission method provided in one or more embodiments of this application, and execute an instruction included in the program.

It may be understood that, the base station 400 may be the network device 101 in the wireless communications system 100 shown in FIG. 2, and may be implemented as a base transceiver station, a wireless transceiver, a basic service set (BSS), an extended service set (ESS), a NodeB, an eNodeB, an access point, a TRP, or the like.

It should be noted that, the base station 400 shown in FIG. 6 is merely an implementation of this embodiment of this application, and in actual application, the base station 400 may alternatively include more or fewer components. This is not limited herein.

Based on the foregoing embodiments respectively corresponding to the wireless communications system 100, the relay apparatus 300, and the base station 400, to measure interference across links in a multi-hop relay system, an embodiment of this application provides a signal transmission method. A first device and a second device in the following method embodiment may be relay apparatuses 300. Alternatively, the first device and the second device in the following method embodiment may respectively be a communications apparatus 500 and a communications apparatus 600 in a subsequent embodiment in FIG. 12. The first device (or the second device) in the following method embodiment may be implemented as a base station having a relay function, or may be implemented as a terminal having a relay function, or may be implemented as another communications apparatus having a relay function. This is not limited in this application.

A main invention principle of this application may include: In the three-hop relay systems shown in FIG. 3A and FIG. 3B, the relay 1 configures a reference signal resource for the relay 2 accessing the relay 1, where a reference signal is used to measure interference between the access link and the backhaul link 1. In this way, the relay 2 may receive or send the reference signal on the configured resource, to measure the interference.

Specifically, main solutions for measuring the interference by using the reference signal may include the following.

Figure 7A:
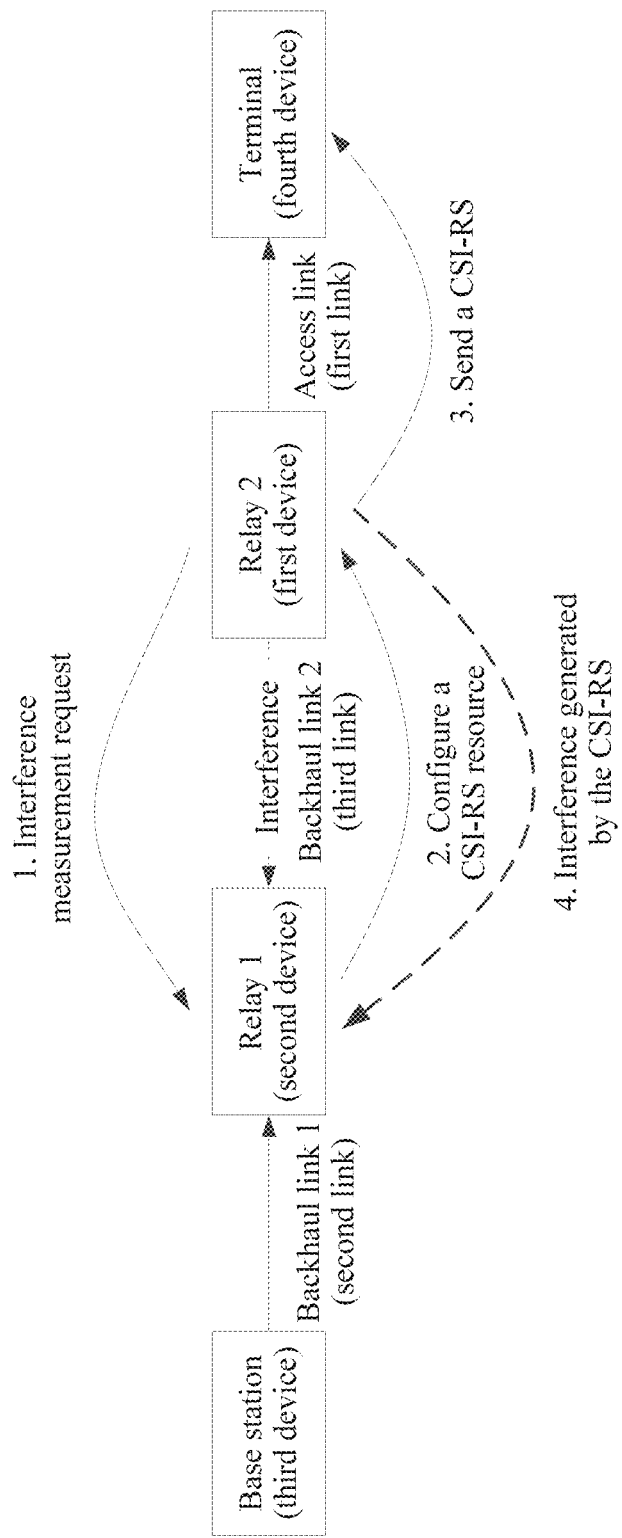
FIG. 7A to FIG. 7D are schematic diagrams of principles of several solutions for measuring interference between links according to this application.

Solution 1: As shown in FIG. 7A, the relay 1 may configure a downlink reference signal (such as CSI-RS) resource for the relay 2, where a downlink reference signal (such as a CSI-RS) is used to measure interference of downlink transmission on the access link to downlink transmission on the backhaul link 1. The relay 2 may map the downlink reference signal to the downlink reference signal resource, and then send the downlink reference signal on the access link. Because the relay 1 can also receive the downlink reference signal transmitted by the relay 2 (as shown in FIG. 3A), the relay 1 can measure interference of the relay 2 to the relay 1, namely, the interference of the downlink transmission on the access link to the downlink transmission on the backhaul link 1.

Figure 7B:
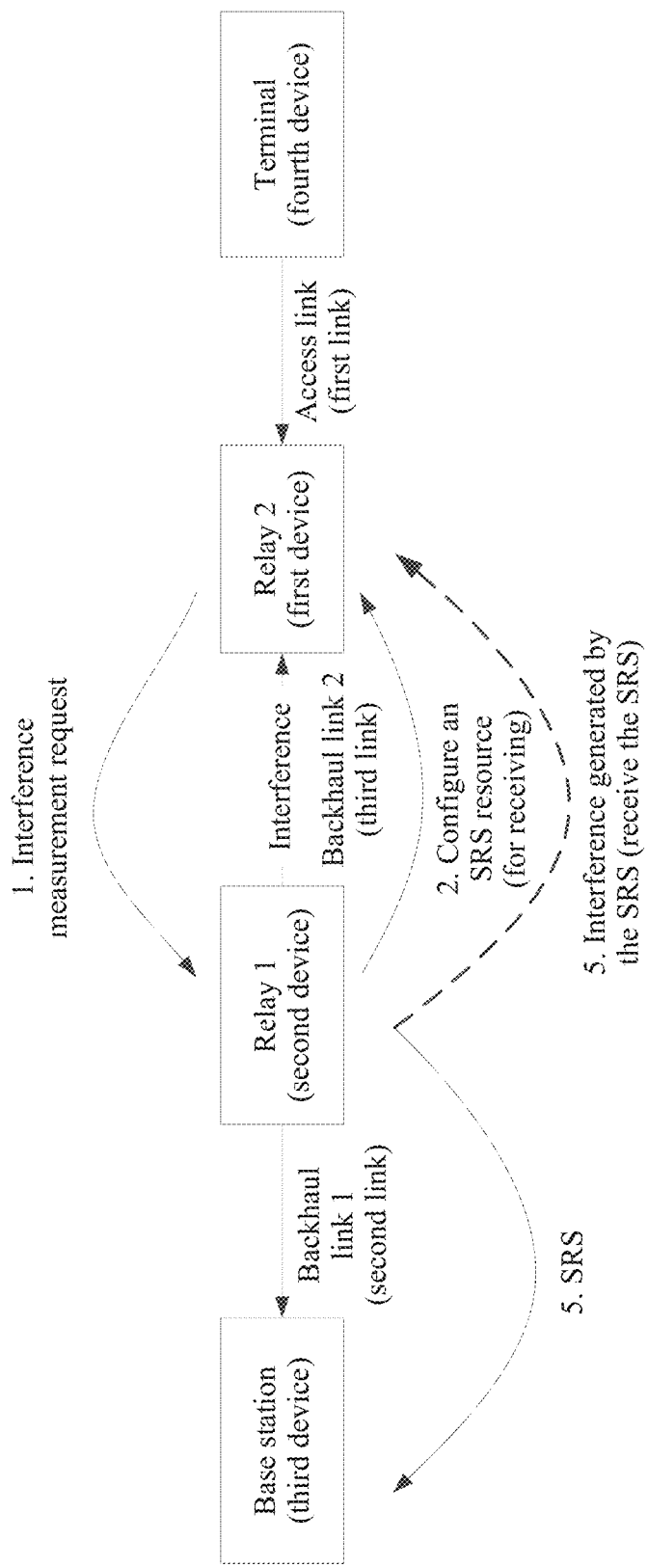

Solution 2: As shown in FIG. 7B, the relay 1 may configure an uplink reference signal (such as SRS) resource for the relay 2, where an uplink reference signal (such as an SRS) is used to measure interference of uplink transmission on the backhaul link 1 to uplink transmission on the access link. The relay 1 sends the uplink reference signal on the backhaul link 1. Because the relay 2 can also receive, on the access link based on the uplink reference signal resource, the uplink reference signal transmitted by the relay 1 (as shown in FIG. 3B), the relay 2 can measure interference of the relay 1 to the relay 2, namely, the interference of the uplink transmission on the backhaul link 1 to the uplink transmission on the access link.

Interference measurement types in the foregoing solution 1 and solution 2 are different. Optionally, the relay 2 may determine, based on a type of the reference signal, an interference measurement type used by the reference signal. It is learned from the foregoing solution 1 and solution 2 that, it may be determined that the downlink reference signal (such as the CSI-RS) is used to measure interference of the access link to the backhaul link 1, and it may be determined that the uplink reference signal (such as the SRS) is used to measure interference of the backhaul link 1 to the access link.

Figure 7C:
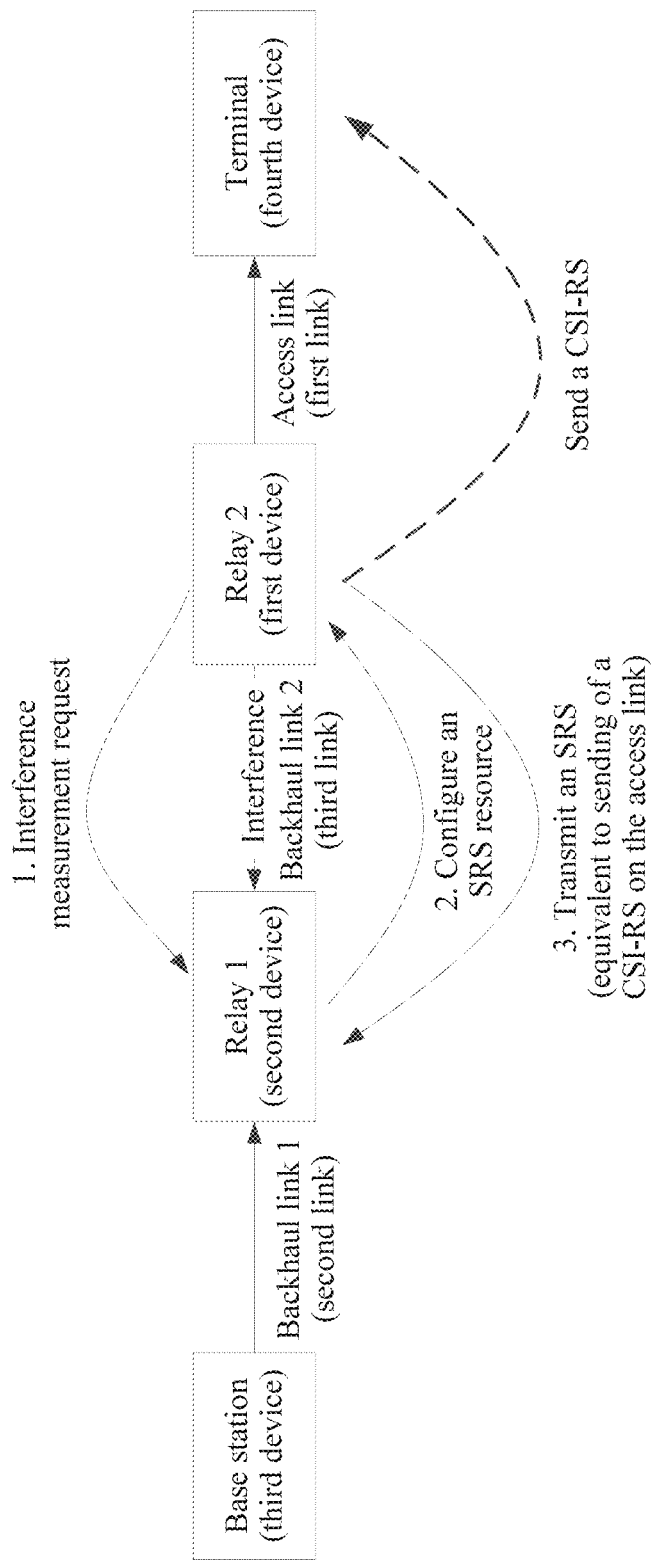

In addition, the reference signal on the link (namely, the backhaul link 2) between the relay 1 and the relay 2 may be further used to measure interference between the access link and the backhaul link 1. Main solutions may include the following:

Solution 3: As shown in FIG. 7C, the relay 1 may configure an uplink reference signal (such as SRS) resource for the relay 2, where an uplink reference signal (such as an SRS) is used to measure interference of downlink transmission on the access link to downlink transmission on the backhaul link 1. Specifically, the relay 2 may send the uplink reference signal on the backhaul link 2. The relay 1 may receive the uplink reference signal by using a receiving apparatus corresponding to the backhaul link 1, and perform channel measurement. A measurement result corresponding to the uplink reference signal may be used by the relay 1 to determine interference of the relay 2 to the relay 1, namely, the interference of the downlink transmission on the access link to the downlink transmission on the backhaul link 1.

A precondition of the foregoing solution 3 is that sending of a reference signal by the relay 2 on the backhaul link 2 can be equivalent to sending of a reference signal by the relay 2 on the access link. The precondition may be implemented in the following manner: Antenna ports for the relay 2 to send the reference signals on the backhaul link 2 and the access link are quasi co-located (QCL), or beams for the relay 2 to send the reference signals on the backhaul link 2 and the access link are the same. The beam in this application is a radio wave having a particular direction and shape in space formed when a radio signal is transmitted or received through at least one antenna port. The beam may be formed by adjusting an amplitude and/or a phase of the radio signal transmitted or received through the at least one antenna port, or the beam may be formed by using another method, for example, adjustment of a related parameter of an antenna unit. For all beams mentioned in subsequent content, refer to the explanation herein.

It may be understood that, because sending of the reference signal by the relay 2 on the backhaul link 2 can be equivalent to sending of the reference signal by the relay 2 on the access link, the uplink reference signal received by the relay 1 by using the receiving apparatus corresponding to the backhaul link 1 can be equivalent to interference generated to the relay 1 by the reference signal that is sent by the relay 2 on the access link, namely, the interference of the downlink transmission on the access link to the downlink transmission on the backhaul link 1.

Figure 7D:
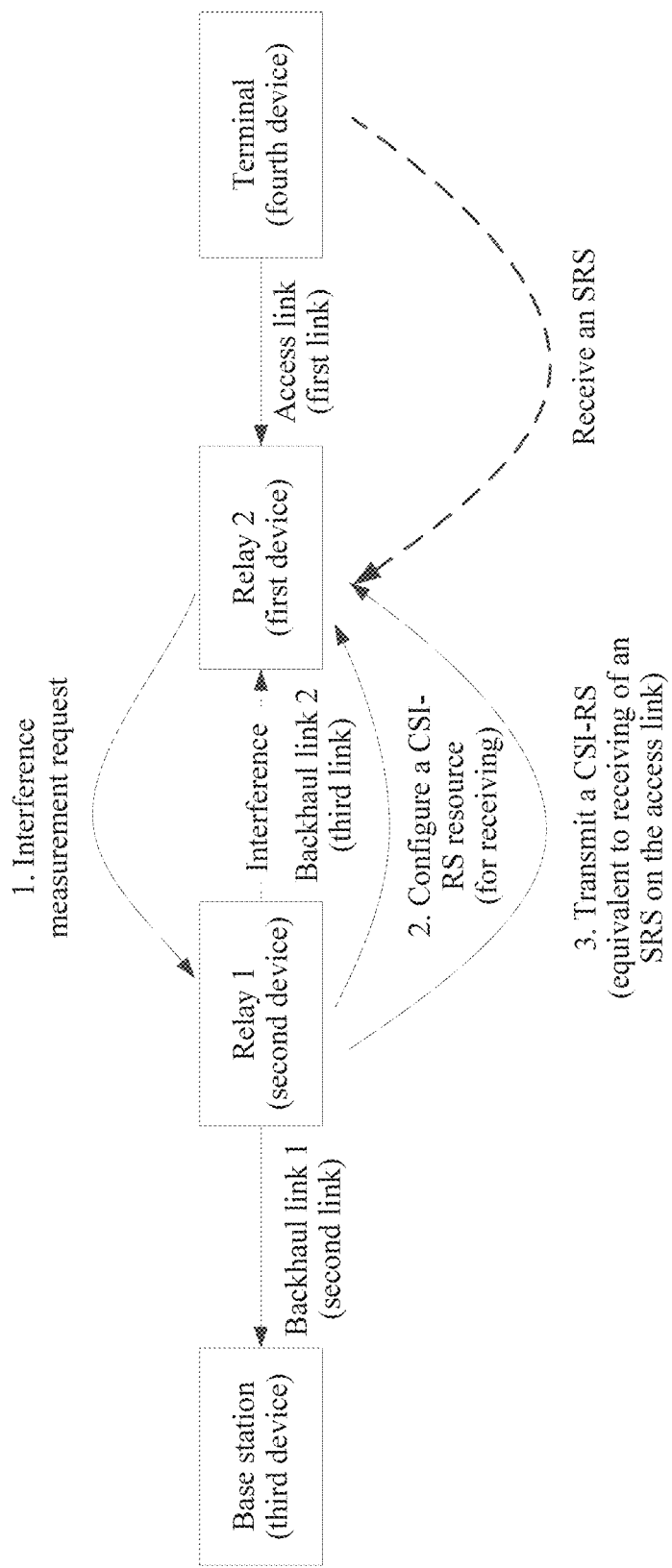

Solution 4: As shown in FIG. 7D, the relay 1 may configure a downlink reference signal (such as CSI-RS) resource for the relay 2, where a downlink reference signal (such as a CSI-RS) is used to measure interference of uplink transmission on the backhaul link 1 to the uplink transmission on the access link. The relay 1 may send the downlink reference signal by using a transmitting apparatus corresponding to the backhaul link 1. The relay 2 receives the uplink reference signal on the backhaul link 2, and performs channel measurement. A measurement result corresponding to the uplink reference signal may be used by the relay 2 to determine interference of the relay 1 to the relay 2, namely, the interference of the uplink transmission on the backhaul link 1 to the uplink transmission on the access link.

A precondition of the foregoing solution 4 is that receiving of a reference signal by the relay 2 on the backhaul link 2 can be equivalent to receiving of a reference signal by the relay 2 on the access link. The precondition may be implemented in the following manner: Antenna ports for the relay 2 to receive the reference signals on the backhaul link 2 and the access link are quasi co-located (QCL), or beams for the relay 2 to receive the reference signals on the backhaul link 2 and the access link are the same.

It may be understood that, because receiving of the reference signal by the relay 2 on the backhaul link 2 can be equivalent to receiving of the reference signal by the relay 2 on the access link, the downlink reference signal received by the relay 2 can be equivalent to interference generated to the relay 2 by the downlink reference signal that is sent by the relay 1 by using the transmitting apparatus corresponding to the backhaul link 1, namely, the interference of the uplink transmission on the backhaul link 1 to the uplink transmission on the access link.

In the foregoing solution 3 and solution 4, the relay 2 has a multi-link beam correspondence capability. In this application, the multi-link beam correspondence capability of the relay 2 may be summarized as a capability of the relay 2 to send or receive, on the access link and the backhaul link 2, reference signals on antenna ports having a quasi co-location (QCL) relationship. The multi-link beam correspondence capability of the relay 2 may alternatively be summarized as a capability of the relay 2 to send or receive reference signals on the access link and the backhaul link 2 by using a same beam or a same spatial filter. The spatial filter may be at least one of the following: precoding, a weight of an antenna port, a phase deflection of an antenna port, or an amplitude gain of an antenna port. Herein, an access link of the relay 2 is an uplink access link between the relay 2 and a terminal, and a backhaul link of the relay 2 is an uplink backhaul link 2 between the relay 2 and the relay 1.

Optionally, the backhaul link and the access link of the relay 2 (or the relay 1) may correspond to two sets of transceiver apparatuses. If the two sets of transceiver apparatuses have a same receive/transmit characteristic, the relay 2 (or the relay 1) has the multi-link beam correspondence capability; otherwise, the relay 2 (or the relay 1) does not have the multi-link beam correspondence capability.

Optionally, the backhaul link and the access link of the relay 2 (or the relay 1) may share a same set of transceiver apparatus. It may be understood that, because the backhaul link and the access link of the relay 2 (or the relay 1) share the same set of transceiver apparatus, transmit (or receive) beams for the backhaul link and the access link are the same, to be specific, the relay 2 (or the relay 1) has the multi-link beam correspondence capability.

It should be understood that, in the solution 3 shown in FIG. 7C, if the relay 1 has the multi-link beam correspondence capability, whether the relay 1 uses the receiving apparatus corresponding to the backhaul link 1 or the receiving apparatus corresponding to the backhaul link 2 to receive an SRS may not matter. Therefore, a receive beam for the relay 1 on the backhaul link 1 and a receive beam for the relay 1 on the backhaul link 2 are the same. Similarly, in the solution 4 shown in FIG. 7D, if the relay 1 has the multi-link beam correspondence capability, whether the relay 1 uses the transmitting apparatus corresponding to the backhaul link 1 or the transmitting apparatus corresponding to the backhaul link 2 to receive a CSI-RS may not matter.

With reference to the foregoing four solutions, interference measurement types corresponding to a reference signal used to measure interference between links may include the following two types.

A first measurement type is measurement of the interference of the downlink transmission on the access link to the downlink transmission on the backhaul link 1, or measurement of interference of the downlink transmission on the access link to the relay 1.

A second measurement type is measurement of the interference of the uplink transmission on the backhaul link 1 to the uplink transmission on the access link, or measurement of the interference of the uplink transmission on the backhaul link 1 to the relay 2.

In this application, the measurement type corresponding to the reference signal may be indicated in the following several manners:

In a first manner, the relay 1 may add indication information of the measurement type to resource configuration information sent to the relay 2. For example, a reserved field in existing resource configuration information is extended, and the extended reserved field is used to indicate the measurement type. The example is merely an example provided in this application, and should not constitute a limitation.

In a second manner, the relay 1 may additionally send indication information to the relay 2, where the indication information is used to indicate the measurement type. In this application, the indication information may be referred to as first indication information.

In a third manner, the reference signal resource may be associated with the measurement type. For example, a reference signal mapped to a resource represented by a "resource pattern (or set) 1" is used for interference measurement of the first measurement type, and a reference signal mapped to a resource represented by a "resource pattern (or set) 2" is used for interference measurement of the second measurement type. The example is merely used to explain this application, and should not constitute a limitation. Specifically, the association may be predefined in a protocol, or may be statically or semi-statically configured by using higher layer signaling. Specific implementation of the association is not limited in this application.

In addition to indicating the first measurement type, the relay 1 may further instruct the relay 2 to send the reference signal on the configured resource (referring to FIG. 7A and FIG. 7C), to instruct the relay 2 to perform the downlink transmission on the access link to measure the interference of the downlink transmission on the access link to the downlink transmission on the backhaul link 1. In this way, the relay 2 may send the reference signal according to the instruction. The relay 1 may receive the reference signal, to measure the interference of the relay 2 to the relay 1.

Similarly, in addition to indicating the second measurement type, the relay 1 may further instruct the relay 2 to receive the reference signal on the configured resource (referring to FIG. 7B and FIG. 7D), to instruct the relay 2 to measure the interference of the uplink transmission on the backhaul link 1 to the uplink transmission on the access link. In this way, the relay 2 may receive, according to the instruction, the reference signal sent by the relay 1, to measure the interference of the relay 1 to the relay 2.

Optionally, the first indication information may alternatively be used to instruct the relay 2 to send the reference signal or receive the reference signal on the configured resource. Optionally, such information used to instruct the relay 2 to send the reference signal or receive the reference signal on the configured resource may alternatively be carried in the resource configuration information sent by the relay 1 to the relay 2.

In the three-hop relay systems shown in FIG. 3A and FIG. 3B or FIG. 7A to FIG. 7D, the relay 2 may be referred to as a first device, the relay 1 may be referred to as a second device, the network device (such as the base station) may be referred to as a third device, and the terminal may be referred to as a fourth device. The access link may be referred to as a first link, the backhaul link 1 may be referred to as a second link, and the backhaul link 2 may be referred to as a third link.

The main invention principle described by using the three-hop relay systems shown in FIG. 3A and FIG. 3B or FIG. 7A to FIG. 7D is also applicable to a more-hop relay system. In the more-hop relay system, the main invention principle can be applied to any three-hop relay. It should be understood that, in the more-hop relay system, the third device may be a relay device rather than a network device, and the fourth device may be a relay device rather than a terminal.

The resource in this application includes at least one of a time-frequency resource or a code domain resource. The time-frequency resource includes a time domain resource and a frequency domain resource, and is usually represented by a resource element (RE), a resource block (RB), a symbol, a subcarrier, and a transmission time interval (TTI). For definitions of the resource element, the resource block, and other concepts, refer to, without limitation to, an LTE standard, and definitions of various time-frequency resource forms in future communications standards may be different. The code domain resource is a sequence code used for code division multiplexing.

The quasi co-location (QCL) in this application may be described as follows:

The QCL means that two antenna ports have a same spatial parameter, or means that a difference between spatial parameters of two antenna ports is less than a specific threshold. Herein, the antenna ports are antenna ports with different antenna port numbers, and/or antenna ports with a same antenna port number that send or receive information on different time resources and/or frequency resources and/or code domain resources, and/or antenna ports with different antenna port numbers that send or receive information on different time resources and/or frequency resources and/or code domain resources. Herein, the spatial parameter may include at least one of a delay spread, a Doppler spread, a Doppler frequency shift, an average delay, an average gain, an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, or a resource identifier. The beam may include at least one of precoding, a weight sequence number, or a beam sequence number. The angle may be decomposition values in different dimensions, or a combination of decomposition values in different dimensions. The resource identifier includes a channel state information-reference signal (CSI-RS) resource identifier, or an SRS resource identifier, or a resource identifier of a synchronization signal/synchronization signal block, or a resource identifier of a preamble sequence transmitted on a PRACH, or a DMRS resource identifier, and is used to indicate a beam for the resource.

It should be understood that, if the two antenna ports are QCL, a spatial parameter of one antenna port may be determined based on a parameter of the other antenna port.

For example, that the two antenna ports have a QCL relationship may mean that the two antenna ports have a same AOA or AOD when transmitting (or receiving) signals, to indicate that the two antenna ports have a same receive beam or transmit beam. For another example, that the two antenna ports are QCL may mean that there is a correspondence between AOAs and AODs used when the two antenna ports transmit (or receive) signals. For still another example, that the two antenna ports are QCL may mean that there is a correspondence between AODs and AOAs used when the two antenna ports transmit (or receive) signals.

That the two antenna ports have a QCL relationship may alternatively be understood that the two antenna ports have a beam correspondence. Corresponding beams include at least one of the following: a same receive beam, a same transmit beam, a transmit beam corresponding to a receive beam, or a receive beam corresponding to a transmit beam. In other words, based on the beam correspondence, an uplink transmit beam can be determined based on a downlink receive beam, or a downlink receive beam can be determined based on an uplink transmit beam. A same beam may mean that two antenna ports for reference signals have a QCL relationship, and different beams may mean that two antenna ports for reference signals do not have a QCL relationship. Herein, the same beam may alternatively be understood as a same spatial filter.

That the two antenna ports have a QCL relationship may alternatively be understood that signals transmitted through the two antenna ports have corresponding beam pair links (BPL) or a same BPL, and the corresponding BPLs include at least one of the following: a same downlink BPL, a same uplink BPL, an uplink BPL corresponding to a downlink BPL, or a downlink BPL corresponding to an uplink BPL.

Based on the foregoing invention principle, four embodiments are used in the following to describe in detail a signal transmission method provided in this application.

Figure 8:
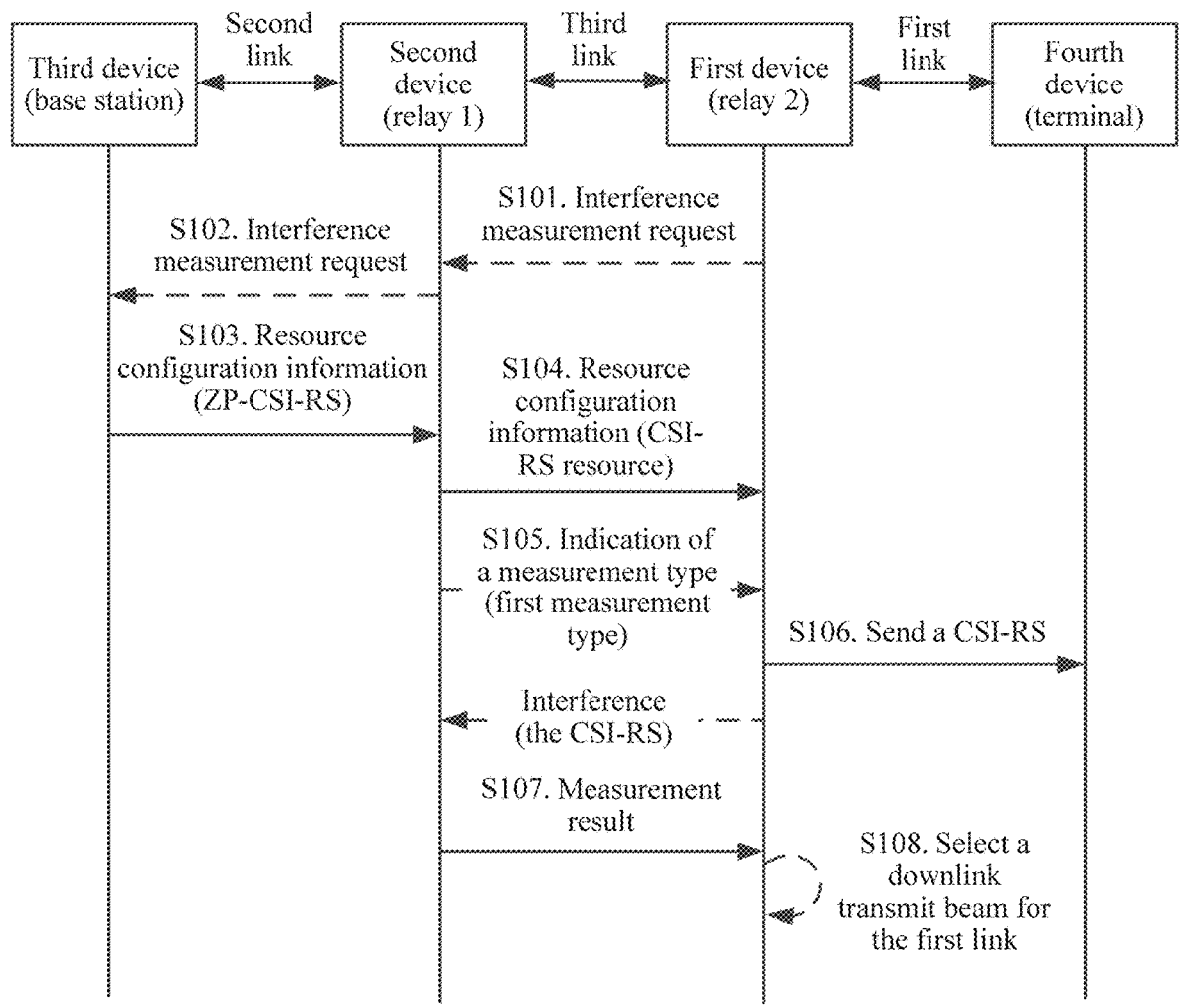
FIG. 8 is an example schematic diagram of a resource allocation method according to an embodiment of this application.

FIG. 8 shows a signal transmission method according to an embodiment of this application. In the embodiment in FIG. 8, a first device does not have a multi-link beam correspondence capability. The first device sends a CSI-RS on a first link based on a CSI-RS resource configured by a second device. This corresponds to the scenario shown in FIG. 7A. The CSI-RS is used to measure interference of downlink transmission on the first link to downlink transmission on a second link. The CSI-RS may be but is not limited to a CSI-RS. The CSI-RS is used as an example in the following to describe the embodiment in FIG. 8 in detail.

S101 and S102. Initiate an interference measurement request. Details are as follows:

S101. The first device sends the interference measurement request to the second device, to request to measure interference of the first device to the second device, that is to say, to request to measure the interference of the downlink transmission on the first link to the downlink transmission on the second link, that is to say, to request interference measurement of a first measurement type. Optionally, the interference measurement request may include a resource configuration parameter such as a subcarrier spacing corresponding to a reference signal used for interference measurement, and a resource quantity. Herein, the resource quantity may be determined by scanning a beam quantity. For example, when one resource corresponds to one beam, the resource quantity is the same as the beam quantity.

S102. The second device sends the interference measurement request to the third device, to request to measure the interference of the first device to the second device, that is to say, request to measure the interference of the downlink transmission on the first link to the downlink transmission on the second link. Optionally, the interference measurement request may include a resource configuration parameter such as the subcarrier spacing corresponding to the reference signal used for interference measurement, and the resource quantity. Herein, the resource quantity may be determined by scanning the beam quantity. A resource requested in S102 may be a downlink zero power resource, for example, a downlink CSI-RS zero power (ZP-CSI-RS) resource.

Not limited to S101 and S102, the interference measurement may alternatively be initiated by the second device. For example, under a condition that the second device already knows that the first device is a relay, the second device may trigger the interference measurement, that is to say, send the interference measurement request to a third device. That is to say, S101 is optional.

Not limited to S101 and S102, the interference measurement may alternatively be initiated by the third device. For example, under a condition that the third device already knows that the second device and the first device are relays, the third device may trigger the interference measurement. Namely, S101 and S102 are optional, and the third device may directly configure, for the first device, a resource for sending the reference signal. Refer to S103.

S103 and S104. Allocate a CSI-RS resource used for the interference measurement.

Specifically, the third device may send resource configuration information to the second device, where a resource indicated by the resource configuration information may be a downlink zero power resource, for example, a ZP-CSI-RS resource. Refer to S103. Then the second device may send resource configuration information to the first device, where a resource indicated by the resource configuration information may be a CSI-RS resource used by the first device to send the CSI-RS on the first link. Refer to S104.

Herein, the CSI-RS resource may be a resource allocated by the second device for the CSI-RS from the downlink zero power resource. The CSI-RS resource may include at least one of a time-frequency resource or a code domain resource (a sequence code used for code division).

Specifically, that a measurement type corresponding to the CSI-RS is the first measurement type may be indicated in the following several manners.

In a first manner, the resource configuration information may further include indication information of the first measurement type. Specifically, the resource configuration information sent by the third device may include the indication information used to indicate that the downlink zero power resource is used to measure the interference of the first device to the second device. Specifically, the resource configuration information sent by the second device may also include the indication information used to indicate that the CSI-RS resource is used by the first device to send the CSI-RS on the first link.

Optionally, when indicating the following meaning, the indication information may also indicate that the measurement type corresponding to the CSI-RS is the first measurement type:

For example, the indication information may indicate that the CSI-RS resource configured by the second device is used to respond to the interference measurement requests in S101 and S102. For another example, the indication information may be a CSI-RS beam group indication used to indicate that a transmit beam for the CSI-RS is a beam in a downlink beam group for the first link. For another example, the indication information may indicate that the CSI-RS is used to measure interference between links. For still another example, the indication information may indicate that the CSI-RS resource configured by the second device is used for the first device to transmit the CSI-RS. For still another example, the indication information may indicate that the CSI-RS resource configured by the second device belongs to a resource for the first link. The examples are merely some embodiments provided in this application, and a specific indication meaning of the indication information is not limited in this application, provided that the first measurement type corresponding to the CSI-RS can be clearly indicated.

In a second manner, the second device may send first indication information to the first device, to indicate that the measurement type corresponding to the CSI-RS is the first measurement type. Refer to S105.

Optionally, when indicating the following meaning, the first indication information may also indicate that the measurement type corresponding to the CSI-RS is the first measurement type.

For example, the first indication information may indicate that the CSI-RS resource configured by the second device is used to respond to the interference measurement requests in S101 and S102. For another example, the first indication information may be a CSI-RS beam group indication used to indicate that a transmit beam for the CSI-RS is a beam in an uplink beam group for a third link. For another example, the first indication information may indicate that the CSI-RS is used to measure interference between links. For still another example, the indication information may indicate that the CSI-RS resource configured by the second device is used for the first device to transmit the CSI-RS. For still another example, the indication information may indicate that the CSI-RS resource configured by the second device belongs to a resource for the first link. The examples are merely some embodiments provided in this application, and a specific indication meaning of the first indication information is not limited in this application, provided that the first measurement type corresponding to the CSI-RS can be clearly indicated.

In a third manner, the CSI-RS resource (or the ZP-CSI-RS resource) may be a resource associated with the first measurement type. The resource associated with the first measurement type may be predefined in a protocol or configured by using higher layer signaling.

For example, if the CSI-RS resource is a resource for the first link, the CSI-RS resource is the resource associated with the first measurement type. The example is merely an example provided in this application, there may be a different example in practical utilization, and no limitation should be constituted.

In addition to indicating the first measurement type, the second device may further instruct the first device to send the CSI-RS. Optionally, the first indication information may alternatively be used to instruct the first device to send the CSI-RS. Optionally, such information used to instruct the first device to send the CSI-RS may alternatively be carried in the resource configuration information sent by the second device to the first device.

For the foregoing several manners of indicating the first measurement type, specifically refer to related content of the invention principle part. Details are not described herein again.

S106. The first device sends the CSI-RS on a resource indicated by CSI-RS resource configuration information, that is to say, sends the CSI-RS on the first link. It may be understood that, when the first device sends the CSI-RS on the first link, the second device can also receive the CSI-RS (namely, interference) transmitted by the first device, that is to say, the second device can detect the interference generated by the first device to the second device. The interference is the interference of the downlink transmission on the first link to the downlink transmission on the second link.

S107. The second device measures the interference, and returns a measurement result for the interference to the first device.

Specifically, implementations of the measurement result may include the following two manners:

In a first manner, the measurement result may include a reference signal resource (or resource group) identifier, for example, a resource indicator or a resource set ID. One resource (or resource group) identifier may correspond to one transmit beam of the first device.

Specifically, some resource (or resource group) identifiers corresponding to available beams (or unavailable beams) may be predefined in a protocol or statically or semi-statically configured by using higher layer signaling. That is to say, there is a correspondence between a beam for the first device to send the CSI-RS on the first link and beams corresponding to these resource (or resource group) identifiers.

In a second manner, the measurement result may include a measurement value corresponding to each CSI-RS resource, for example, reference signal received power (RSRP), a channel quality indicator (CQI), a received signal strength indicator (RSSI), a reference signal received quality (RSRQ), or a corresponding quantized value.

Not limited to the foregoing two manners, the measurement result may alternatively be implemented in another manner. This is not limited herein.

S108. The first device selects a downlink transmit beam for the first link based on the measurement result. In this way, the first device can select a better downlink transmit beam, to prevent the first device from generating interference to the second device.

Optionally, if the measurement result is implemented in the foregoing first manner, the first device may determine, based on a resource (or resource group) identifier configured in a protocol, whether a beam for the CSI-RS is available or unavailable, that is to say, determine whether there is a QCL relationship between the CSI-RS and a signal carried on a resource (or a resource group) configured in the protocol. Optionally, such a manner of determining a beam based on a resource (or resource group) identifier may be specified to be effective in a predefined resource or a resource configured by a base station.

Optionally, if the measurement result is implemented in the foregoing second manner, the first device may select a downlink transmit beam for the first link based on the foregoing measurement value.

Figure 9:
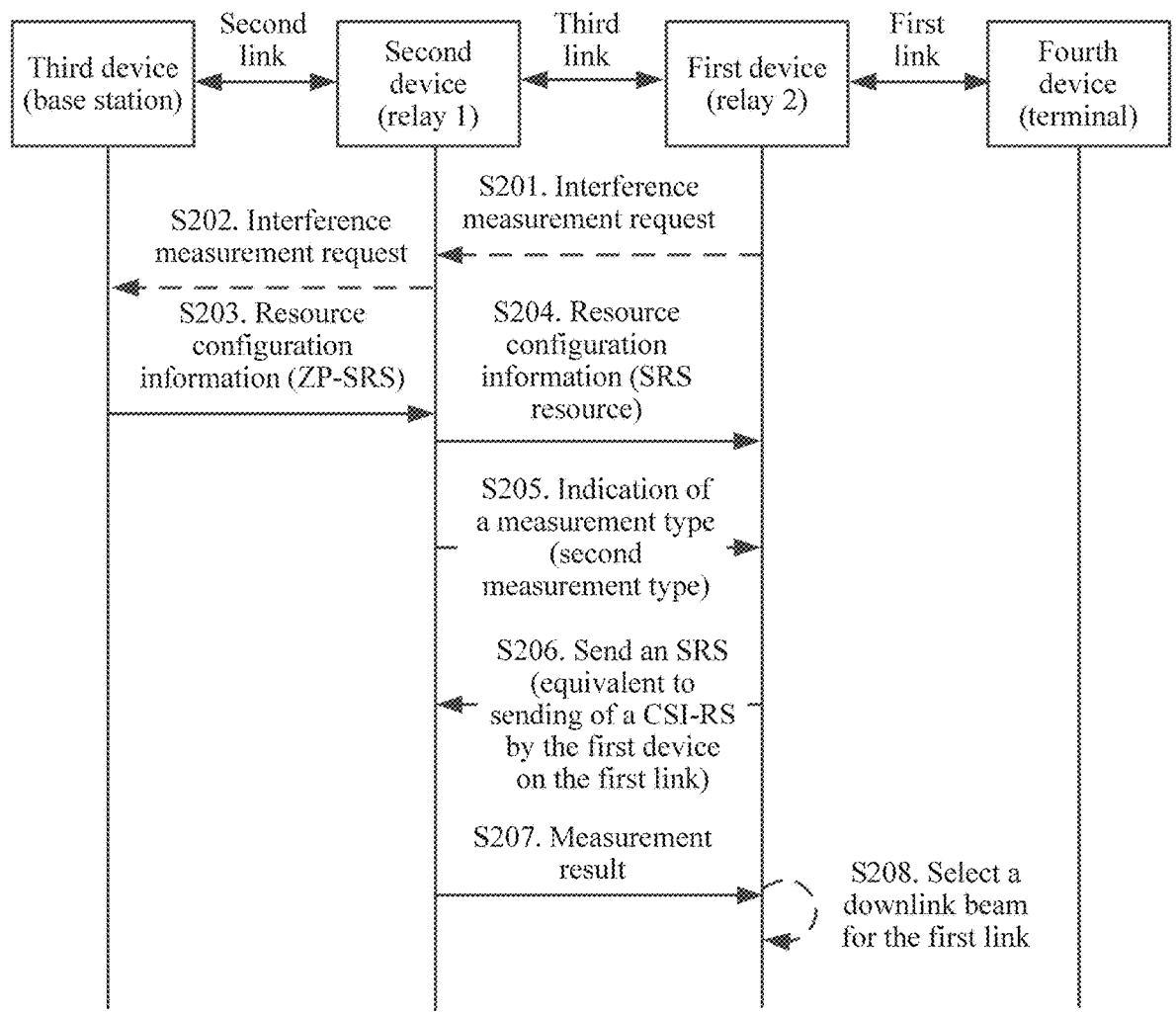
FIG. 9 is an example schematic diagram of a resource allocation method according to another embodiment of this application.

FIG. 9 shows a signal transmission method according to another embodiment of this application. In the embodiment in FIG. 9, a first device has a multi-link beam correspondence capability. The first device transmits an uplink reference signal on a third link based on an uplink reference signal resource configured by a second device. This corresponds to the scenario shown in FIG. 7C. The uplink reference signal is used to measure interference of downlink transmission on a first link to downlink transmission on a second link. The uplink reference signal may be but is not limited to an SRS. The SRS is used as an example in the following to describe the embodiment in FIG. 9 in detail.

S201 and S202. Initiate an interference measurement request.

For details, refer to S101 and S102 in the embodiment in FIG. 8. Details are not described herein again.

S203 and S204. Allocate an SRS resource used for interference measurement.

Specifically, a third device may send resource configuration information to the second device, where a resource indicated by the resource configuration information may be an uplink zero power resource, for example, a ZP-SRS resource. Refer to S203. Then the second device may send resource configuration information to the first device, where a resource indicated by the resource configuration information may be an SRS resource used by the first device to send the SRS on the first link. Refer to S204.

Herein, the SRS resource may be a resource allocated by the second device for the SRS from the uplink zero power resource (such as the ZP-SRS resource). The SRS resource may include at least one of a time-frequency resource or a code domain resource (a sequence code used for code division).

Specifically, that a measurement type corresponding to the SRS is a first measurement type may be indicated in the following several manners:

In a first manner, the resource configuration information may further include indication information of the first measurement type. Specifically, the resource configuration information sent by the third device may include the indication information used to indicate that the uplink zero power resource is used to measure interference of the first device to the second device. Specifically, the resource configuration information sent by the second device may also include the indication information used to indicate that the SRS resource is used by the first device to send the SRS on the first link.

Optionally, when indicating the following meaning, the indication information may also indicate that the measurement type corresponding to the SRS is the first measurement type:

For example, the indication information may indicate that the SRS resource configured by the second device is used to respond to the interference measurement requests in S201 and S202. For another example, the indication information may be an SRS beam group indication used to indicate that a transmit beam for the SRS is a beam in an uplink beam group for the third link or a beam in a downlink beam group for the first link. For another example, the indication information may indicate that the SRS is used to measure channel state information of a single link, that is to say, used to measure channel state information of the third link. For still another example, the indication information may indicate that the SRS resource configured by the second device is used by the first device to transmit the SRS. For still another example, the indication information may indicate that the SRS resource configured by the second device belongs to a resource for the third link. The examples are merely some embodiments provided in this application, and a specific indication meaning of the indication information is not limited in this application, provided that the first measurement type corresponding to the SRS can be clearly indicated.

In a second manner, the second device may send first indication information to the first device, to indicate that the measurement type corresponding to the SRS is the first measurement type. For details, refer to S205.

Optionally, when indicating the following meaning, the first indication information may also indicate that the measurement type corresponding to the SRS is the first measurement type:

For example, the first indication information may indicate that the SRS resource configured by the second device is used to respond to the interference measurement requests in S201 and S202. For another example, the first indication information may be an SRS beam group indication used to indicate that a transmit beam for the SRS is a beam in an uplink beam group for the third link or a beam in a downlink beam group for the first link. For another example, the first indication information may indicate that the SRS is used to measure channel state information of a single link, that is to say, used to measure channel state information of the third link. For still another example, the indication information may indicate that the SRS resource configured by the second device is used by the first device to transmit the SRS. For still another example, the indication information may indicate that the SRS resource configured by the second device belongs to a resource for the third link. The examples are merely some embodiments provided in this application, and a specific indication meaning of the first indication information is not limited in this application, provided that the first measurement type corresponding to the SRS can be clearly indicated.

In a third manner, the SRS resource (or the ZP-SRS resource) may be a resource associated with the first measurement type. The resource associated with the second measurement type may be predefined in a protocol or configured by using higher layer signaling.

In addition to indicating the first measurement type, the second device may further instruct the first device to send the SRS. Optionally, the first indication information may alternatively be used to instruct the first device to send the SRS. Optionally, such information used to instruct the first device to send the SRS may alternatively be carried in the resource configuration information sent by the second device to the first device.

For the foregoing several manners of indicating the first measurement type, specifically refer to related content of the invention principle part. Details are not described herein again.

S206. The first device sends the SRS on the third link. Correspondingly, the second device receives the SRS transmitted by the first device. It can be learned by referring to the foregoing invention principle part that, if the second device does not have a beam correspondence capability, the second device receives, by using a receiving apparatus corresponding to the second link, the SRS sent by the first device. If the second device has a beam correspondence capability, the second device may receive, by using a receiving apparatus corresponding to the second link, the SRS transmitted by the first device, or may receive, by using a receiving apparatus corresponding to the third link, the SRS transmitted by the first device. Optionally, a receiving apparatus corresponding to the first link and the receiving apparatus corresponding to the second link may be same receiving apparatuses (or a same receiving apparatus).

It may be understood that, because the first device has the multi-link beam correspondence capability, sending of a reference signal by the first device on the third link can be equivalent to sending of a reference signal by the first device on the first link. Therefore, the SRS received by the second device can be equivalent to interference generated to the second device when the first device sends the reference signal on the first link. The interference is the interference of the downlink transmission on the first link to the downlink transmission on the second link.

S207. The second device measures the interference, and returns a measurement result to the first device.

S208. The first device selects a downlink transmit beam for the first link based on the measurement result. In this way, the first device can select a better downlink transmit beam, to prevent the first device from generating interference to the second device.

Specifically, for specific implementation of the measurement result and specific implementation of selecting the beam based on the measurement result, refer to related content of the embodiment in FIG. 8. Details are not described herein again.

Figure 10:
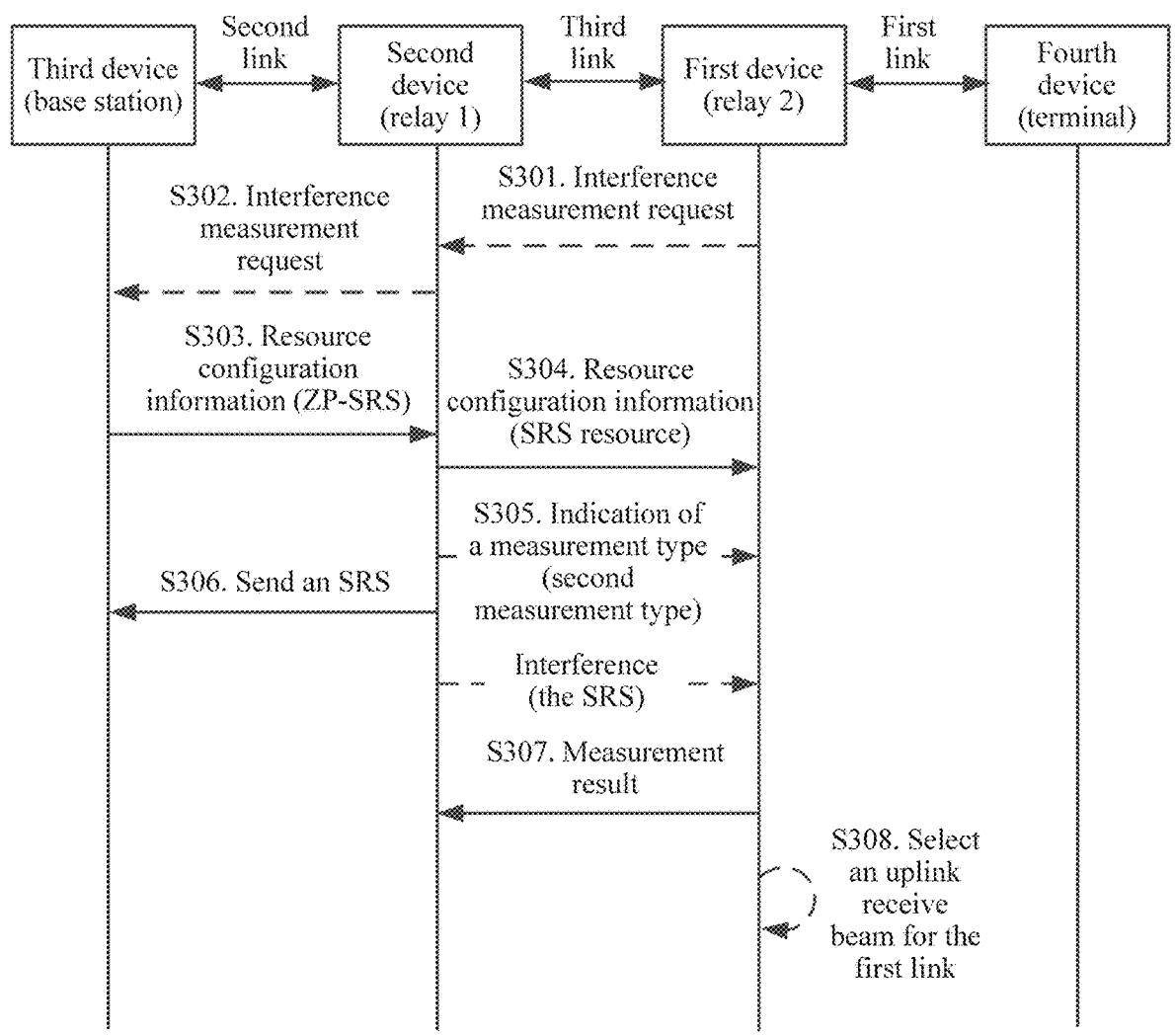
FIG. 10 is an example schematic diagram of a resource allocation method according to still another embodiment of this application.

FIG. 10 shows a signal transmission method according to still another embodiment of this application. In the embodiment in FIG. 10, a first device does not have a multi-link beam correspondence capability. The first device receives an uplink reference signal based on an uplink reference signal resource configured by a second device. This corresponds to the scenario shown in FIG. 7B. The uplink reference signal is used to measure interference of uplink transmission on a second link to uplink transmission on a first link. The uplink reference signal may be but is not limited to an SRS. The SRS is used as an example in the following to describe the embodiment in FIG. 10 in detail.

S301 and S302. Initiate an interference measurement request.

Specifically, the interference measurement request is used to request to measure interference of the second device to the first device, that is to say, request to measure the interference of the uplink transmission on the second link to the uplink transmission on the first link, that is to say, request interference measurement of a second measurement type. For specific implementation of S301 and S302, refer to S101 to S103 in the embodiment in FIG. 8. Details are not described herein again.

S303 and S304. Allocate an SRS resource used for interference measurement.

Specifically, a third device may send resource configuration information to the second device, where a resource indicated by the resource configuration information may be a downlink zero power resource, for example, a ZP-SRS resource. Refer to S303. Then the second device may send resource configuration information to the first device, where a resource indicated by the resource configuration information may be an SRS resource used by the first device to receive an SRS transmitted by the second device. Refer to S304.

Herein, the SRS resource may be a resource allocated by the second device for the SRS from the downlink zero power resource. The SRS resource may include at least one of a time-frequency resource or a code domain resource (a sequence code used for code division).

Specifically, that a measurement type corresponding to the SRS is the second measurement type may be indicated in the following several manners.

In a first manner, the resource configuration information may further include indication information of the second measurement type. Specifically, the resource configuration information sent by the third device may include the indication information used to indicate that the downlink zero power resource is used to measure the interference of the second device to the first device. Specifically, the resource configuration information sent by the second device may also include the indication information used to indicate that the SRS resource is used by the first device to receive the SRS.

Optionally, when indicating the following meaning, the indication information may also indicate that the measurement type corresponding to the SRS is the second measurement type:

For example, the indication information may indicate that the SRS resource configured by the second device is used to respond to the interference measurement requests in S301 and S302. For another example, the indication information may be an SRS beam group indication used to indicate that a receive beam for the SRS is a beam in an uplink beam group for the first link. For another example, the indication information may indicate that the SRS is used to measure interference between links. For still another example, the indication information may indicate that the SRS resource configured by the second device is used by the second device to transmit the SRS. For still another example, the indication information may indicate that the SRS resource configured by the second device belongs to a resource for the second link. The examples are merely some embodiments provided in this application, and a specific indication meaning of the indication information is not limited in this application, provided that the second measurement type corresponding to the SRS can be clearly indicated.

In a second manner, the second device may send first indication information to the first device, to indicate that the measurement type corresponding to the SRS is the second measurement type. Refer to S305.

Optionally, when indicating the following meaning, the first indication information may also indicate that the measurement type corresponding to the SRS is the second measurement type:

For example, the first indication information may indicate that the SRS resource configured by the second device is used to respond to the interference measurement requests in S101 and S102. For another example, the first indication information may be an SRS beam group indication used to indicate that a receive beam for the SRS is a beam in an uplink beam group for the first link. For another example, the indication information may indicate that the SRS is used to measure interference between links. For still another example, the indication information may indicate that the SRS resource configured by the second device is used by the second device to transmit the SRS. For still another example, the indication information may indicate that the SRS resource configured by the second device belongs to a resource for the second link. The examples are merely some embodiments provided in this application, and a specific indication meaning of the first indication information is not limited in this application, provided that the second measurement type corresponding to the SRS can be clearly indicated.

In a third manner, the SRS resource (or the ZP-SRS resource) may be a resource associated with the second measurement type. The resource associated with the second measurement type may be predefined in a protocol or configured by using higher layer signaling.

In addition to indicating the second measurement type, the second device may further instruct the first device to receive the SRS. Optionally, the first indication information may alternatively be used to instruct the first device to receive the SRS. Optionally, such information used to instruct the first device to receive the SRS may alternatively be carried in the resource configuration information sent by the second device to the first device.

For the foregoing several manners of indicating the second measurement type, specifically refer to related content of the invention principle part. Details are not described herein again.

S306. The second device sends the SRS on the second link. It may be understood that, when the second device sends an SRS on the second link, the first device can also receive the SRS (namely, interference) transmitted by the second device, that is to say, the first device can detect the interference generated by the second device to the first device. The interference is the interference of the uplink transmission on the second link to the uplink transmission on the first link.

S307. The first device measures the interference, and returns a measurement result for the interference to the second device.

S308. The first device selects an uplink receive beam for the first link based on the measurement result. In this way, the first device can select a better uplink receive beam, to prevent the second device from generating interference to the first device.

Specifically, for specific implementation of the measurement result and specific implementation of selecting the beam based on the measurement result, refer to related content of the embodiment in FIG. 8. Details are not described herein again.

Figure 11:
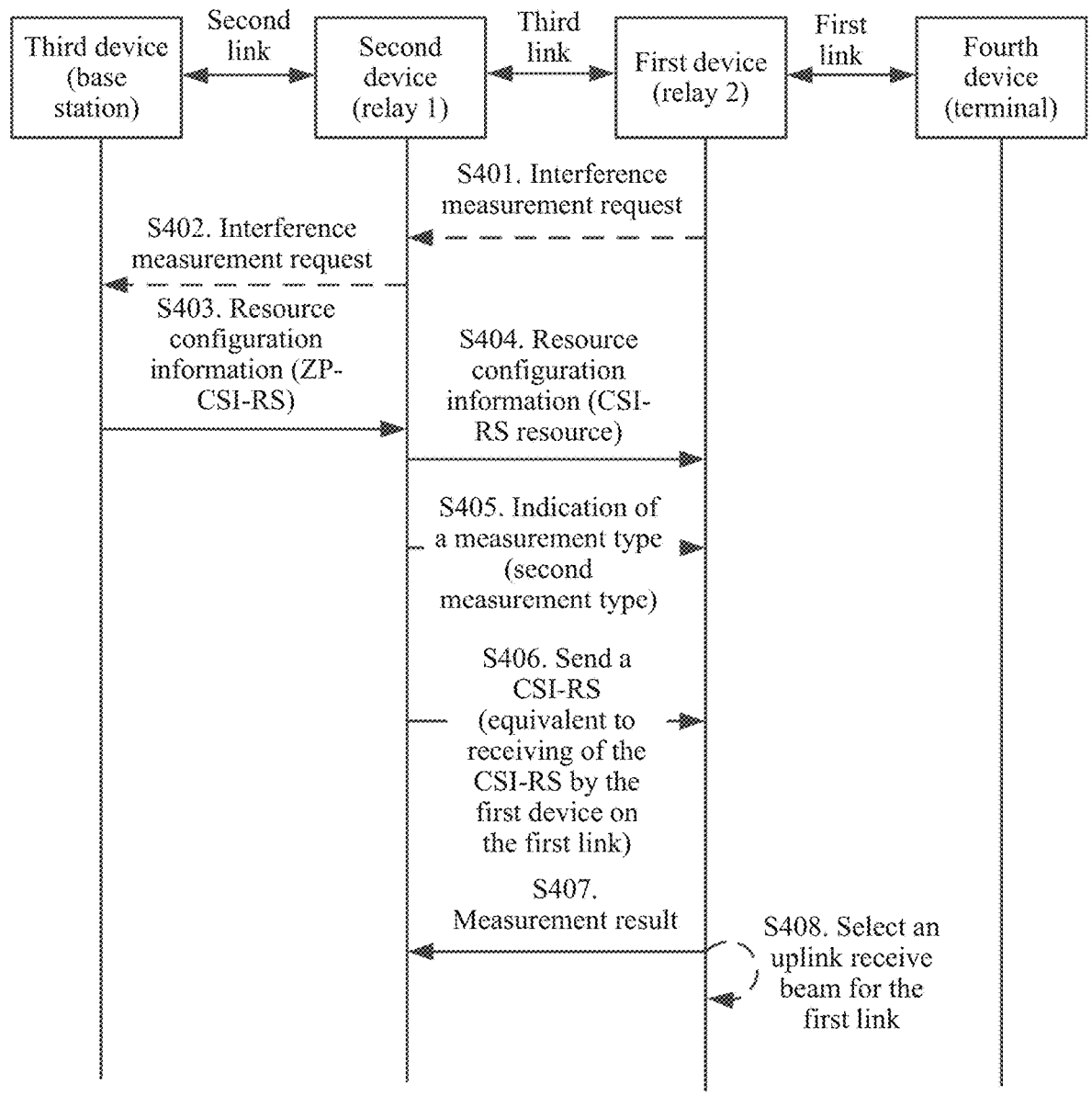
FIG. 11 is an example schematic diagram of a resource allocation method according to still another embodiment of this application.

FIG. 11 shows a signal transmission method according to still another embodiment of this application. In the embodiment in FIG. 11, a first device has a multi-link beam correspondence capability. The first device receives a downlink reference signal based on a downlink reference signal resource configured by a second device. This corresponds to the scenario shown in FIG. 7D. The downlink reference signal is used to measure interference of uplink transmission on a second link to uplink transmission on a first link. The downlink reference signal may be but is not limited to a CSI-RS. The CSI-RS is used as an example in the following to describe the embodiment in FIG. 11 in detail.

S401 and S402. Initiate an interference measurement request.

S403 and S404. Allocate a CSI-RS resource used for the interference measurement.

Specifically, a third device may send resource configuration information to the second device, where a resource indicated by the resource configuration information may be an uplink zero power resource, for example, a ZP-CSI-RS resource. Refer to S403. Then the second device may send resource configuration information to the first device, where a resource indicated by the resource configuration information may be a CSI-RS resource used by the first device to receive the CSI-RS on a third link. Refer to S404.

Herein, the CSI-RS resource may be a resource allocated by the second device for the CSI-RS from the uplink zero power resource (such as the ZP-CSI-RS resource). The CSI-RS resource may include at least one of a time-frequency resource or a code domain resource (a sequence code used for code division).

Specifically, that a measurement type corresponding to the CSI-RS is a second measurement type may be indicated in the following several manners.

In a first manner, the resource configuration information may further include indication information of the second measurement type. Specifically, the resource configuration information sent by the third device may include the indication information used to indicate that the downlink zero power resource is used to measure interference of the second device to the first device. Specifically, the resource configuration information sent by the second device may also include the indication information used to indicate that the CSI-RS resource is used by the first device to receive the CSI-RS on the third link.

Optionally, when indicating the following meaning, the indication information may also indicate that the measurement type corresponding to the CSI-RS is the second measurement type:

For example, the indication information may indicate that the CSI-RS resource configured by the second device is used to respond to the interference measurement requests in S401 and S402. For another example, the indication information may be a CSI-RS beam group indication used to indicate that a receive beam for the CSI-RS is a beam in a downlink beam group for the third link or a beam in an uplink beam group for the first link. For another example, the indication information may indicate that the CSI-RS is used to measure channel state information of a single link, that is to say, used to measure channel state information of the third link. For still another example, the indication information may indicate that the CSI-RS resource configured by the second device is used by the second device to transmit the CSI-RS. For still another example, the indication information may indicate that the CSI-RS resource configured by the second device belongs to a resource for the third link. The examples are merely some embodiments provided in this application, and a specific indication meaning of the indication information is not limited in this application, provided that the second measurement type corresponding to the CSI-RS can be clearly indicated.

In a second manner, the second device may send first indication information to the first device, to indicate that the measurement type corresponding to the CSI-RS is the second measurement type. For details, refer to S405.

Optionally, when indicating the following meaning, the first indication information may also indicate that the measurement type corresponding to the CSI-RS is the second measurement type.

For example, the indication information may indicate that the CSI-RS resource configured by the second device is used to respond to the interference measurement requests in S401 and S402. For another example, the indication information may be a CSI-RS beam group indication used to indicate that a receive beam for the CSI-RS is a beam in a downlink beam group for the third link or a beam in an uplink beam group for the first link. For another example, the indication information may indicate that the CSI-RS is used to measure channel state information of a single link, that is to say, used to measure channel state information of the third link. For still another example, the indication information may indicate that the CSI-RS resource configured by the second device is used by the second device to transmit the CSI-RS. For still another example, the indication information may indicate that the CSI-RS resource configured by the second device belongs to a resource for the third link. The examples are merely some embodiments provided in this application, and a specific indication meaning of the first indication information is not limited in this application, provided that the second measurement type corresponding to the CSI-RS can be clearly indicated.

In a third manner, the CSI-RS resource (or the ZP-CSI-RS resource) may be a resource associated with the second measurement type. The resource associated with the second measurement type may be predefined in a protocol or configured by using higher layer signaling.

In addition to indicating the second measurement type, the second device may further instruct the first device to receive the CSI-RS. Optionally, the first indication information may alternatively be used to instruct the first device to receive the CSI-RS. Optionally, such information used to instruct the first device to receive the CSI-RS may alternatively be carried in the resource configuration information sent by the second device to the first device.

For the foregoing several manners of indicating the second measurement type, specifically refer to related content of the invention principle part. Details are not described herein again.

S406. The second device sends the CSI-RS on the third link. Correspondingly, the first device receives the CSI-RS sent by the second device. It can be learned by referring to the foregoing invention principle part that, if the second device does not have a beam correspondence capability, the second device sends the CSI-RS by using a transmitting apparatus corresponding to the second link. If the second device has a beam correspondence capability, the second device may send the CSI-RS by using a transmitting apparatus corresponding to the second link, or may send the CSI-RS by using a transmitting apparatus corresponding to the third link. Optionally, for the second device, the transmitting apparatus corresponding to the second link and the transmitting apparatus corresponding to the third link may be same transmitting apparatuses (or a same transmitting apparatus).

It may be understood that, because the first device has the multi-link beam correspondence capability, receiving of a reference signal by the first device on the third link can be equivalent to receiving of a reference signal by the first device on the first link. Therefore, the CSI-RS received by the first device can be equivalent to interference generated to the first device when the second device sends the reference signal. The interference is the interference of the downlink transmission on the first link to the downlink transmission on the second link.

S407. The second device measures the interference, and returns a measurement result to the first device.

S408. The first device selects an uplink transmit beam for the first link based on the measurement result. In this way, the first device can select a better uplink receive beam, to prevent the second device from generating interference to the first device.

Specifically, for specific implementation of the measurement result and specific implementation of selecting the beam based on the measurement result, refer to related content of the embodiment in FIG. 8. Details are not described herein again.

With reference to the embodiments respectively corresponding to FIG. 8 to FIG. 11, some optional embodiments provided in this application are further complementarily described in the following.

In some embodiments, the first device may send first reporting information to the second device, to report whether the first device has the multi-link beam correspondence capability. Optionally, the second device may further continue to report, to the third device, whether the first device has the multi-link beam correspondence capability. For descriptions of the beam correspondence capability, refer to the invention principle part. Details are not described herein again.

The first device reports the multi-link beam correspondence capability to the second device, so that the second device can determine, depending on whether the first device has the beam correspondence capability, an interference measurement method to be used. Specifically, the second device may determine, depending on whether the first device has the beam correspondence capability, a solution corresponding to a specific above-described embodiment to be used. Details may be described as follows:

When the reference signal is used for the interference measurement of the first measurement type, if the first device does not have the beam correspondence capability, the second device may configure the first device to send the downlink reference signal (such as the CSI-RS) on the first link. Refer to the embodiment in FIG. 8. If the first device has the beam correspondence capability, the second device may configure the first device to send the uplink reference signal (such as the SRS) on the third link. Refer to the embodiment in FIG. 9. Optionally, if the first device has the beam correspondence capability, the second device may alternatively configure the first device to send the downlink reference signal (such as the CSI-RS) on the first link. Refer to the embodiment in FIG. 8.

When the reference signal is used for the interference measurement of the second measurement type, if the first device does not have the beam correspondence capability, the second device may configure the first device to receive the uplink reference signal (such as the SRS). Refer to the embodiment in FIG. 10. If the first device has the beam correspondence capability, the second device may configure the first device to receive the downlink reference signal (such as the CSI-RS) on the third link. Refer to the embodiment in FIG. 11. Optionally, if the first device has the beam correspondence capability, the second device may alternatively configure the first device to receive the uplink reference signal (such as the SRS). Refer to the embodiment in FIG. 10.

In some embodiments, after the interference between the links is measured by using the reference signal, the measurement result is not limited to being used to select a beam, but may be further used for another aspect. For example, the measurement result may be used to select a data transmission frequency resource. When there is relatively strong interference in a band range, a device does not schedule a resource in the band for data transmission. For another example, the measurement result may be further used to select a relay. When there is relatively strong interference between the first link and the second link, the terminal may directly access the second device. Application of the interference measurement is not limited in this application.

Figure 12:
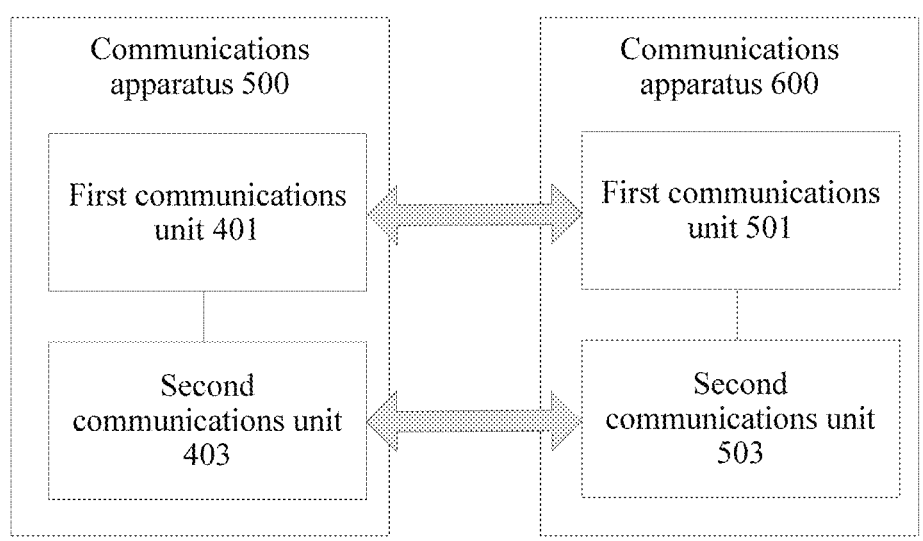
FIG. 12 is a functional block diagram of a wireless communications system, a relay apparatus, and a network device according to this application.

FIG. 12 shows a wireless communications system and a related communications apparatus according to this application. The wireless communications system 10 includes a communications apparatus 500 and a communications apparatus 600. The wireless communications system 10 may be the wireless communications system 100 shown in FIG. 2. The communications apparatus 500 and the communications apparatus 600 are both relay nodes, and may both be the relay devices 103 in the wireless communications system 100 shown in FIG. 2. The communications apparatus 500 (or the communications apparatus 600) may be a network device having a relay function, or may be a terminal having a relay function. Specifically, in the three-hop relay system shown in FIG. 3A or FIG. 3B, the communications apparatus 500 may be the relay 2, the communications apparatus 600 may be the relay 1, a link between the communications apparatus 500 and a terminal (or another relay device) may be referred to as a first link, a link between the communications apparatus 600 and a base station (or another relay device) may be referred to as a second link, and a link between the communications apparatus 500 and the communications apparatus 600 may be referred to as a third link. In hardware implementation, the communications apparatus 500 may be the relay apparatus 300 in the embodiment in FIG. 5A or FIG. 5B, and the communications apparatus 600 may be the base station 400 in the embodiment in FIG. 6. Functional units respectively included in the communications apparatus 500 and the communications apparatus 600 are described respectively in the following.

As shown in FIG. 12, the communications apparatus 500 may include a first communications unit 401 and a second communications unit 403.

The first communications unit 401 may be configured to receive reference signal resource configuration information sent by the communications apparatus 600. Herein, the reference signal resource configuration information may be used to measure interference between the first link and the second link.

The second communications unit 403 may be configured to send or receive a reference signal on a resource indicated by the reference signal resource configuration information.

In the communications apparatus 500, the second communications unit 403 is responsible for sending or receiving the reference signal, and the first communications unit 401 is responsible for receiving some configuration information (such as the resource configuration information) sent by the communications apparatus 600 or reporting information such as a multi-link beam correspondence capability and a measurement result to the communications apparatus 600.

Specifically, for specific implementation of the functional units included in the communications apparatus 500, refer to the foregoing embodiments. Details are not described herein again.

As shown in FIG. 12, the communications apparatus 600 may include a first communications unit 501 and a second communications unit 503.

The first communications unit 501 may be configured to send reference signal resource configuration information to the communications apparatus 500. Herein, the reference signal resource configuration information may be used to measure interference between the first link and the second link.

The second communications unit 503 may be configured to send or receive a reference signal on a resource indicated by the resource configuration information.

In the communications apparatus 600, the second communications unit 403 is responsible for sending or receiving the reference signal, and the first communications unit 401 is responsible for sending some configuration information (such as the resource configuration information) to the communications apparatus 500 or receiving information such as a multi-link beam correspondence capability and a measurement result reported by the communications apparatus 500.

Specifically, for specific implementation of the functional units included in the communications apparatus 600, refer to the foregoing embodiments. Details are not described herein again.

In conclusion, through implementation of the technical solutions provided in this application, interference between links can be measured in a multi-hop relay system, thereby avoiding such interference through beam selection or another approach.

It may be understood that, when the embodiments of this application are applied to a network device chip (or a terminal chip), the network device chip (or the terminal chip) can implement the function of the first device in the foregoing method embodiment. In this case, the network device chip (or the terminal chip) receives the reference signal resource configuration information from another module (such as a radio frequency module or an antenna) in the network device (or the terminal).

When the embodiments of this application are applied to a network device chip (or a terminal chip), the network device chip (or the terminal chip) can also implement the function of the second device in the foregoing method embodiments. In this case, the network device chip (or the terminal chip) sends the reference signal resource configuration information to another module (such as a radio frequency module or an antenna) in the network device (or the terminal).

The communications apparatus in the embodiments of this application may be a network device, or may be a terminal device, or may be a chip system. The chip system includes at least one chip, and may further include another discrete component. The chip system may be applied to the network device or the terminal device, to support the network device or the terminal device in completing the methods provided in the embodiments of this application.

A person of ordinary skill in the art may understand that all or some of the processes of the methods in the embodiments may be implemented by a computer program instructing related hardware. The program may be stored in a computer-readable storage medium. When executed, the program may include the processes of the foregoing method embodiments. The foregoing storage medium includes: any medium that can store program code, such as a ROM, a random access memory RAM, a magnetic disk, or an optical disc.

What is claimed is:

1. A signal transmission method, comprising:
receiving, by a first device, resource configuration information from a second device, wherein the resource configuration information is for a reference signal that indicates a measure of interference between a first link and a second link, wherein the first link is a link between the first device and a fourth device, the second link is a link between the second device and a third device, and the first device and the second device are relay nodes between the third device and the fourth device;
sending or receiving, by the first device, the reference signal on a reference signal resource indicated by the resource configuration information;
measuring, by the first or second device, the interference between the first link and the second link; and
sending, by the first device, first reporting information to the second device, wherein the first reporting information indicates whether the first device has a multi-link beam correspondence capability;
wherein the multi-link beam correspondence capability comprises a capability of the first device to send or receive, on the first link and a third link, reference signals on antenna ports having a quasi co-location (QCL) relationship or a capability of the first device to send or receive reference signals on the first link and a third link by using a same beam or a same spatial filter; and
wherein the third link is a link between the second device and the first device.

2. The method according to claim 1, wherein sending or receiving the reference signal comprises sending or receiving, by the first device, the reference signal on the first link based on the resource configuration information.

3. The method according to claim 1, further comprising receiving, by the first device, first indication information from the second device, wherein the first indication information indicates that the reference signal indicates a measure of interference of a downlink transmission on the first link to a downlink transmission on the second link, or that the first device is to send the reference signal on the reference signal resource indicated by the resource configuration information.

4. The method according to claim 1, further comprising receiving, by the first device, first indication information from the second device, wherein the first indication information indicates that the reference signal indicates a measure of interference of an uplink transmission on the second link to an uplink transmission on the first link, or that the first device is to send the reference signal on the reference signal resource indicated by the resource configuration information.

5. The method according to claim 1, wherein the resource configuration information comprises indication information of a measurement type corresponding to the reference signal and wherein the measurement type comprises a measurement of the interference of a downlink transmission on the first link to a downlink transmission on the second link or a measurement of the interference of an uplink transmission on the second link to an uplink transmission on the first link.

6. The method according to claim 1, wherein the reference signal resource indicated by the resource configuration information is associated with a measurement type that comprises a measurement of interference of a downlink transmission on the first link to a downlink transmission on the second link or a measurement of interference of an uplink transmission on the second link to an uplink transmission on the first link.

7. A communications apparatus, comprising:
at least one processor; and
a memory coupled to the at least one processor, the memory storing instructions that when executed by the at least one processor cause the at least one processor to:
receive resource configuration information from a second device, wherein the resource configuration information is for a reference signal that indicates a measure of interference between a first link and a second link;
send or receive the reference signal on a reference signal resource indicated by the resource configuration information; and
measure the interference between the first link and the second link, wherein the first link is a link between the communications apparatus and a fourth device, the second link is a link between the second device and a third device, and the communications apparatus and the second device are relay nodes between the third device and the fourth device; and
sending first reporting information to the second device;
wherein the first reporting information indicates whether the communications apparatus has a multi-link beam correspondence capability;
wherein the multi-link beam correspondence capability comprises a capability of the communications apparatus to send or receive, on the first link and a third link, reference signals on antenna ports having a quasi co-location (QCL) relationship or a capability of the communications apparatus to send or receive reference signals on the first link and a third link by using a same beam or a same spatial filter; and
wherein the third link is a link between the second device and the communications apparatus.

8. The communications apparatus according to claim 7, wherein the at least one processor is configured to send or receive the reference signal on the first link based on the resource configuration information.

9. The communications apparatus according to claim 7, wherein the at least one processor is further configured to receive first indication information from the second device, wherein the first indication information indicates that the reference signal indicates a measure of interference of a downlink transmission on the first link to a downlink transmission on the second link, or that the communications apparatus is to send the reference signal on the resource indicated by the resource configuration information.

10. The communications apparatus according to claim 7, wherein the at least one processor is further configured to receive first indication information from the second device, wherein the first indication information indicates that the reference signal indicates a measure of interference of an uplink transmission on the second link to an uplink transmission on the first link, or that the communications apparatus is to receive the reference signal on a configured resource indicated by the resource configuration information.

11. The communications apparatus according to claim 7, wherein the resource configuration information comprises indication information of a measurement type corresponding to the reference signal and wherein the measurement type comprises a measurement of the interference of a downlink transmission on the first link to a downlink transmission on the second link, or a measurement of the interference of an uplink transmission on the second link to an uplink transmission on the first link.

12. The communications apparatus according to claim 7, wherein the reference signal resource indicated by the resource configuration information is associated with a measurement type and wherein the measurement type comprises a measurement of interference of a downlink transmission on the first link to a downlink transmission on the second link, or a measurement of interference of an uplink transmission on the second link to an uplink transmission on the first link.

13. A communication system, comprising:
a first device; and
a second device;
wherein the first device is configured to:
  receive resource configuration information from the second device, wherein the resource configuration information is for a reference signal that indicates a measure of interference between a first link and a second link, wherein the first link is a link between the first device and a fourth device, the second link is a link between the second device and a third device, and the first device and the second device are relay nodes between the third device and the fourth device;
  send or receive the reference signal on a reference signal resource indicated by the resource configuration information; and
  measure the interference between the first link and the second link;
  sending, by the first device, first reporting information to the second device, wherein the first reporting information indicates whether the first device has a multi-link beam correspondence capability;
wherein the multi-link beam correspondence capability comprises a capability of the first device to send or receive, on the first link and a third link, reference signals on antenna ports having a quasi co-location (QCL) relationship or a capability of the first device to send or receive reference signals on the first link and a third link by using a same beam or a same spatial filter; and
wherein the third link is a link between the second device and the first device and wherein the second device is configured to:
  send the resource configuration information to the first device; and
  send or receive the reference signal on a resource indicated by the resource configuration information.

14. The system according to claim 13, wherein the first device is configured to send or receive the reference signal on the first link based on the resource configuration information and the second device is configured to receive or send the reference signal on the second link.

15. The system according to claim 13, wherein the first device is further configured to receive first indication information from the second device and the second device is further configured to send the first indication information to the first device, wherein the first indication information indicates that the reference signal indicates a measure of interference of a downlink transmission on the first link to a downlink transmission on the second link, or that the first device is to send the reference signal on the reference signal resource indicated by the resource configuration information.

16. The system according to claim 13, wherein the first device is further configured to receive first indication information from the second device and the second device is further configured to send the first indication information to the first device, wherein the first indication information indicates that the reference signal indicates a measure of interference of an uplink transmission on the second link to an uplink transmission on the first link, or that the first device is to receive the reference signal on the reference signal resource indicated by the resource configuration information.

17. The system according to claim 13, wherein the resource configuration information comprises indication information of a measurement type corresponding to the reference signal and wherein the measurement type comprises a measurement of the interference of a downlink transmission on the first link to a downlink transmission on the second link, or a measurement of the interference of an uplink transmission on the second link to an uplink transmission on the first link.

18. The system according to claim 13, wherein the reference signal resource indicated by the resource configuration information for the reference signal is associated with a measurement type and wherein the measurement type comprises a measurement of interference of a downlink transmission on the first link to a downlink transmission on the second link, or a measurement of interference of an uplink transmission on the second link to an uplink transmission on the first link.

* * * * *